United States Patent
Liu et al.

(10) Patent No.: US 10,242,568 B2
(45) Date of Patent: Mar. 26, 2019

(54) ADJUSTMENT OF A LEARNING RATE OF Q-LEARNING USED TO CONTROL TRAFFIC SIGNALS

(71) Applicant: FUJITSU LIMITED, Kawasaki-shi, Kanagawa (JP)

(72) Inventors: Lei Liu, San Jose, CA (US); Wei-Peng Chen, Fremont, CA (US); Ying Liu, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/641,434

(22) Filed: Jul. 5, 2017

(65) Prior Publication Data
US 2018/0261085 A1     Sep. 13, 2018

Related U.S. Application Data

(63) Continuation of application No. 15/641,168, filed on Jul. 3, 2017, now Pat. No. 10,002,530, and a
(Continued)

(51) Int. Cl.
*G08G 1/08*     (2006.01)
*G06N 99/00*    (2010.01)
(Continued)

(52) U.S. Cl.
CPC ......... *G08G 1/08* (2013.01); *G06F 17/30598* (2013.01); *G06K 9/00785* (2013.01);
(Continued)

(58) Field of Classification Search
CPC .............................. G08G 1/08; G06N 99/005
See application file for complete search history.

(56) References Cited

U.S. PATENT DOCUMENTS

| 9,818,297 B2 * | 11/2017 | El-Tantawy | G08G 1/083 |
| 2013/0176146 A1 * | 7/2013 | Dusparic | G08G 1/08 340/907 |
| 2015/0102945 A1 * | 4/2015 | El-Tantawy | G08G 1/083 340/909 |

FOREIGN PATENT DOCUMENTS

| CN | 105118308 A | 12/2015 |
| CN | 106846836 A | 6/2017 |
| DE | 19941854 A1 | 4/2001 |

OTHER PUBLICATIONS

National Transportation Library, Online."Chapter 3, Traffic Signal Control Systems". Retrieved from https://ntl.bts.gov/lib/jpodocs/edldocs1/13480/ch3.pdf (Jun. 23, 2017).
(Continued)

*Primary Examiner* — Sisay Yacob
(74) *Attorney, Agent, or Firm* — Maschoff Brennan

(57) ABSTRACT

Technologies are described to adjust a learning rate of Q-learning being used to control traffic signals at an intersection. In some examples, a method may include generating control actions for traffic signals at an intersection based on Q-learning, determining a frequency of change in traffic pattern of the intersection, and adjusting a learning rate of the Q-learning based on the determined frequency of change in traffic pattern of the intersection. The Q-learning may determine the generated control actions based on at least a portion of historical traffic data of the intersection, and the change in traffic pattern may be a change from a first traffic pattern of the intersection to a second traffic pattern of the intersection.

18 Claims, 18 Drawing Sheets

Related U.S. Application Data continuation-in-part of application No. 15/453,854, filed on Mar. 8, 2017, now Pat. No. 9,972,199.

(51) Int. Cl.
  *G08G 1/005* (2006.01)
  *G06F 17/30* (2006.01)
  *G06K 9/00* (2006.01)
  *F21W 111/023* (2006.01)
  *F21W 111/02* (2006.01)
  *G06K 9/46* (2006.01)
  *G06N 7/00* (2006.01)

(52) U.S. Cl.
  CPC .......... *G06N 99/005* (2013.01); *G08G 1/005* (2013.01); *F21W 2111/02* (2013.01); *F21W 2111/023* (2013.01); *G06K 9/4638* (2013.01); *G06N 7/005* (2013.01)

(56) References Cited

OTHER PUBLICATIONS

City of Toronto, Online. "Traffic Signals". Retrieved from http://www1.toronto.ca/wps/portal/contentonly?vgnextoid=9452722c231ec410VgnVCM10000071d60f89RCRD (1998).
New York City DOT, Online. "About DOT". Retrieved http://www.nyc.gov/html/dot/html/about/dotlibrary.shtml on Jun. 29, 2017.
NSW Roads and Traffic Authority. "Hands on Control: New South Wales' Transport Management Centre". Retrieved http://www.rms.nsw.gov.au/trafficinformation/downloads/tmcbrochure.pdf (2005).
Rhythm Engineering, Online. "How InSync's Real-Time Adaptive Traffic Control Works". Retrieved http://rhythmtraffic.com/insync/how-it-works/ on Jun. 29, 2017.
HDR Engineering, Inc., Online. "Adaptive Traffic Control Systems in the United States: Updated Summary and Comparison". Retrieved http://cdnassets.hw.net/da/ad/6d673e3b4202b713l4ab5eff3446/3675-adaptive-traffic-control-systems-in-the-united-states-updated-summary-and-comparison.pdf (Sep. 2010).
Luo Michael. "For Exercise in New York Futility, Push Button." Retrieved https://web.archive.org/web/20060822094554/http://www.nytimes.com/2004/02/27/nyregion/27BUTT.html?ex=1393218000&en=58284f87fcbbe64d&ei=5007&partner=TECHDIRT (Feb. 27, 2004).
The Columbus Dispatch. "Traffic sensors give bicyclists green lights." Retrieved http://www.dispatch.com/content/stories/local/2013/01/30/bicyclists-given-green-lights.html (Jan. 30, 2013).
Richard Sutton and Andrew Barto, "Reinforcement Learning: An Introduction," MIT Press, Feb. 1998.
Robinson-Mosher, Avram and Egner, Chritopher. "Learning Traffic Light Control Policies." Retrieved http://cs229.stanford.edu/proj2005/RobinsonMosherEgner-LearningTrafficLightControlPolicies.pdf (2005).
K. J. Prabuchandran, et al., "Multi-agent reinforcement learning for traffic signal control." IEEE 17th International Conference on Intelligent Transportation Systems (ITSC) (2014).
Sahar Araghi, et al., "Intelligent Traffic Light Control of Isolated Intersections Using Machine Learning Methods," 2013 IEEE International Conference on Systems, Man, and Cybernetics (2013).
M. Abdoos, et al., "Traffic light control in non-stationary environments based on multi agent Q-learning," 2011 14th International IEEE Conference on Intelligent Transportation Systems (ITSC) (2011).
Stevens, Matt and Yeh, Christopher. "Reinforcement Learning for Traffic Optimization". Stanford University CS 229 (Machine Learning) Final Project (2016).
"Clustering by passing messages between data points," Frey, Brendan J., and Dueck, Dilbert, Science 315.5814 (Feb. 16, 2007): 972-6.
European Search Report in application No. 18179505.5 dated Nov. 22, 2018.

\* cited by examiner

US 10,242,568 B2

ADJUSTMENT OF A LEARNING RATE OF Q-LEARNING USED TO CONTROL TRAFFIC SIGNALS

CROSS-REFERENCE TO RELATED APPLICATION

This Application is a continuation under 35 U.S.C. § 120 of co-pending U.S. patent application Ser. No. 15/641,168, filed on Jul. 3, 2017, which is a continuation-in-part under 35 U.S.C. § 120 of co-pending U.S. patent application Ser. No. 15/453,854, filed on Mar. 8, 2017. The foregoing applications are incorporated herein by reference in their entireties.

FIELD

The described technology relates generally to control of traffic signals.

BACKGROUND

Traffic congestion is becoming an increasing concern. Traffic congestion typically results from increased use of the roads by vehicles, and is characterized by slower vehicle speeds, longer trip times, and increased vehicular queuing. Traffic signals have been widely deployed in an attempt to help alleviate traffic congestion. Proper functioning traffic signals need to not only ensure that traffic moves smoothly and safely, but that pedestrians are protected when crossing the roads.

Various traffic signal control techniques have been proposed. These techniques can be generally categorized as fixed time control, dynamic control, coordinated control, and adaptive control. Fixed time control is rather simple in that traffic signals are changed after a fixed time period. The time period can be pre-configured to different values for different times in a day. Dynamic control incorporates the use of input from detectors, such as sensors, to adjust the traffic signal timing. These detectors can inform the traffic signal controller whether vehicles are present.

Coordinated control is coordinated control of multiple traffic signals, typically by a master controller, which accounts for changing traffic patterns in real-time. Cameras and sensors are used to detect real-time traffic information, and the central controller uses this information to do real-time optimization. One optimization is a "green wave," which is a long string of green lights that allows vehicles to travel long distances without encountering a red light.

Adaptive control incorporates actual traffic demand in the control of traffic signals. Sensors and cameras are used to determine the number of vehicles at an intersection and how long the vehicles have been waiting. The traffic signal controller at this intersection uses this information to control the traffic signal at this intersection, while coordinating its decision with controllers at other intersections.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to some examples, methods to adjust a learning rate of Q-learning being used to control traffic signals at an intersection are described. An example method may include generating control actions for traffic signals at an intersection based on Q-learning, determining a frequency of change in traffic pattern of the intersection, and adjusting a learning rate of the Q-learning based on the determined frequency of change in traffic pattern of the intersection. The Q-learning may determine the generated control actions based on at least a portion of historical traffic data of the intersection, and the change in traffic pattern may be a change from a first traffic pattern of the intersection to a second traffic pattern of the intersection.

The objects and advantages of the embodiments will be realized and achieved at least by the elements, features, and combinations particularly pointed out in the claims. Both the foregoing general description and the following detailed description are given as examples, are explanatory and are not restrictive of the invention, as claimed.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
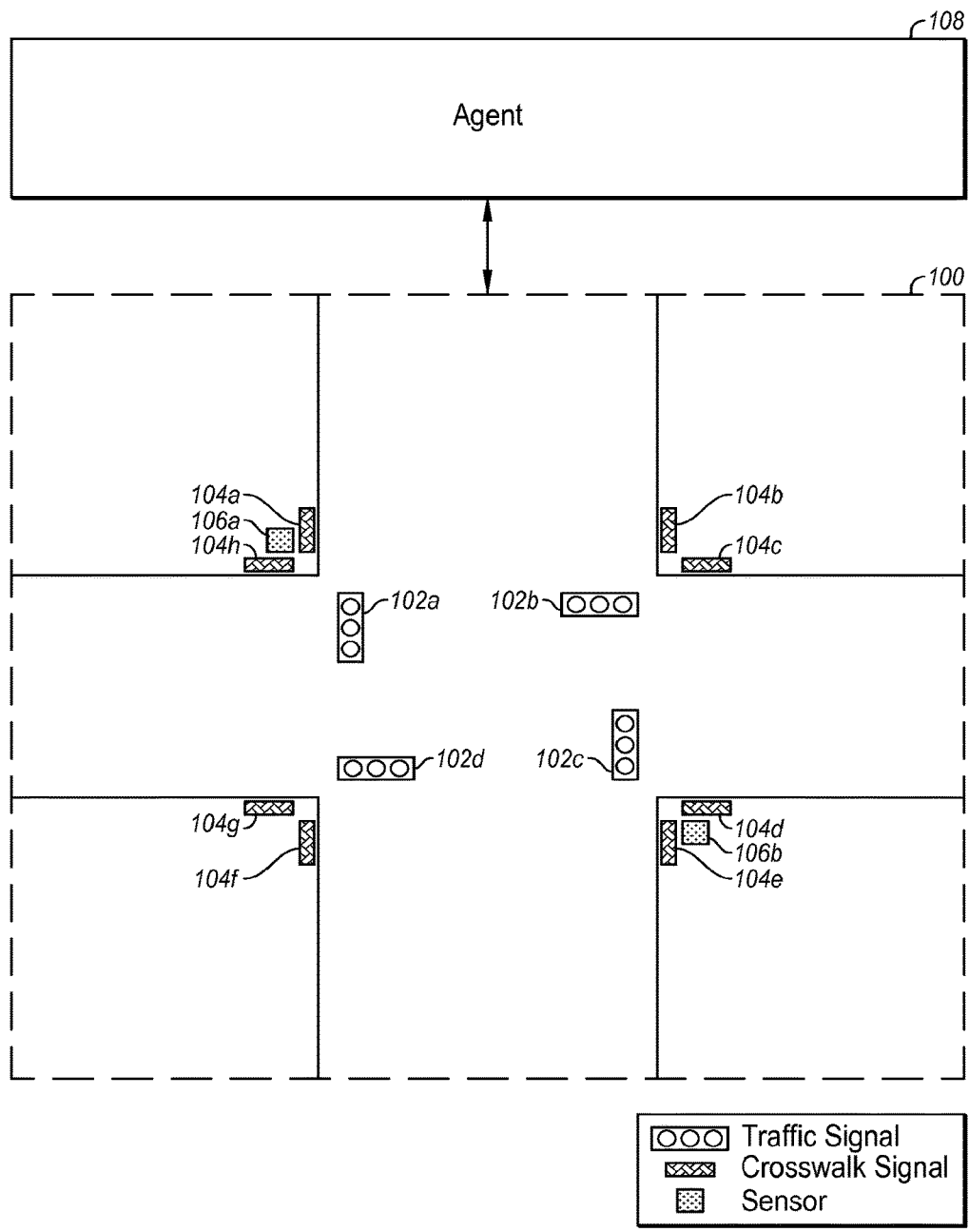
FIG. 1 illustrates selected components of an intersection controlled by traffic signals.

all arranged in accordance with at least some embodiments described herein.

DESCRIPTION OF EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies, including methods, apparatus, systems, devices, and/or computer program products related to traffic signal control that incorporates non-motorized traffic information.

Technologies are described that incorporate non-motorized traffic information in the control of traffic signals. Some embodiments of the technology may utilize multiple Q-learning categories in the control of traffic signals. Some embodiments of the technology may adjust a learning rate of Q-learning utilized to control traffic signals.

Non-motorized traffic is the presence on or use of roadways by non-motorized users, such as pedestrians, bicyclists, and equestrians. Unlike conventional traffic control systems that require manual activation by non-motorized users to inform of their presence at intersections, the presence of such non-motorized users are autonomously detected and accounted for in the control of traffic signals at intersections. The autonomous detection of non-motorized users allows for the safe and efficient flow of both motorized and non-motorized traffic through intersections where traffic flow is being controlled by traffic signals.

In some embodiments, sensors, such as cameras, video cameras, etc., are deployed at intersections to autonomously acquire images (e.g., video images, video feed, etc.) from which the presence of motorized and non-motorized users at the intersections may be determined. Images that include or show the presence of motorized users may be referred to or classified as motorized user presence data. Images that include or show the presence of non-motorized users may be referred to or classified as non-motorized user presence data. As such, images that include or show the presence of both motorized and non-motorized users may be referred to or classified as both motorized user presence data and non-motorized user presence data. Other data from which presence of motorized users may be determined may also be referred to or classified as motorized user presence data. Likewise, other data from which presence of non-motorized users may be determined may also be referred to or classified as non-motorized user presence data.

The autonomously acquired images may also be used to determine different queues of non-motorized users and the lengths of the different queues of non-motorized users, for example, from position and/or direction of travel of the non-motorized users. Likewise, the images may also be used to determine the presence of motorized users (e.g., queue of motorized users) at the intersection, and the different queues of motorized users and the lengths of the different queues of motorized users, for example, from position and/or direction of travel of the motorized users.

Traffic signals at an intersection may include traffic signals for motorized traffic, and traffic signals for non-motorized traffic. The traffic signals for motorized traffic control, guide or direct the flow of motorized users through the intersection. The traffic signals for non-motorized traffic control, guide or direct the flow of non-motorized users through the intersection. The traffic signals at an intersection may be controlled by a control agent (an "agent").

An agent may be configured to generate control actions for both the traffic signals for motorized traffic and the traffic signals for non-motorized traffic at an intersection based on the presence of motorized users and non-motorized users at the intersection. For example, the agent may process the motorized user presence data and the non-motorized user presence data to determine the presence of motorized user queues and queue lengths, and the presence of non-motorized user queues and queue lengths present at the intersection. The agent may generate control actions for the traffic signals based at least in part on the presence of the non-motorized user queues and queue lengths.

In some embodiments, the agent may apply Q-learning, which is a model-free reinforcement learning technique, to generate the control actions for the traffic signals. Q-learning can be used to determine an optimal action-selection policy for any given (finite) Markov decision process (MDP). Q-learning works by learning an action-value function that provides an expected utility of taking a given action (e.g., generating a given control action) in a given state (e.g., given state of the traffic signals) and following the optimal policy thereafter. Examples of policies may be to minimize the length of all queues, both motorized and non-motorized user queues, at the intersection, optimize motorized traffic flow through the intersection, optimize non-motorized traffic flow through the intersection, prioritize traffic flow in a specific direction through the intersection, prioritize public transportation through the intersection, optimize global traffic flow, optimize emission utility, optimize congestion utility, and the like.

In some embodiments, the agent may apply one or more conditions on the operation of the traffic signals in generating the control actions for the traffic signals. In the normal operation of traffic signals at an intersection, certain control actions may not directly follow some other control actions. For example, when pedestrians are crossing the intersection, the traffic signal that is directing the pedestrians to cross the intersection should maintain its action (e.g., green light) for a sufficient period of time while the pedestrians are crossing the intersection. Likewise, a traffic signal that is controlling (e.g., stopping) the flow of motorized users across the flow of pedestrians should not turn green. As another example, flow of motorized traffic in one direction through the intersection may not be followed by a flow of motorized traffic in another direction through the intersection. The conditions may be different depending on the region. For example, the conditions for a four-way intersection may be different than the conditions for a three-way intersection. As another example, conditions in the United States may be different than the conditions in Japan.

In some embodiments, the agent may incorporate historical traffic data in generating the control actions for the traffic signals at the intersection. The historical traffic data may include traffic statistics at different time periods in a day (e.g., traffic between 7:00 AM to 9:00 AM is heavier than between 10:00 AM to 11:00 AM), traffic statistics in the same time period on different days (e.g., traffic between 10:00 AM to 12 Noon on weekdays or on weekends), etc. The historical traffic data may be data of the same intersection (e.g., the intersection being controlled by the agent). The historical traffic data may be data of another, different intersection. The historical data may be data of multiple intersections. For example, the agent may apply an autoregressive integrated moving average (ARIMA) model to calculate estimated instantaneous rewards based on historical traffic data, and integrate the calculated instantaneous rewards in the generating of the control actions.

In some embodiments, the agent may incorporate multiple Q-learning categories in the Q-learning technique to determine an optimal action-selection policy. Q-learning determines an optimal action based on historical traffic data (e.g., motorized traffic information and non-motorized traffic information). For traffic signal control, traffic patterns may vary, sometimes significantly, at different times during a day. For example, the traffic pattern at an intersection may be different during commute and non-commute hours, during midday and midnight, etc. The traffic patterns may also vary when an event (e.g., automobile accident, musical concert, sporting event, holiday, etc.) occurs. When there is a change in the traffic pattern, Q-learning may initially consider the old (prior) traffic pattern data as the historical traffic data. The historical traffic data of the old traffic pattern may not be as useful in determining an optimal action for the new traffic pattern, which may result in Q-learning taking a longer time to determine an optimal action for the new traffic pattern.

In some embodiments, historical traffic data may be clustered into one or more traffic pattern clusters based on one or more criteria, such as motorized traffic arrival rate, non-motorized traffic arrival rate, queue lengths, occurrence of an accident, occurrence of a special event, average motorized traffic waiting time, non-motorized traffic waiting time, and the like. For example, historical traffic data may be analyzed to identify characteristics of different traffic patterns. Historical traffic data may be clustered into traffic pattern clusters based on the identified characteristics. Each of the different traffic pattern clusters, and the historical traffic data associated with or corresponding to the each of the different traffic pattern clusters, may be assigned to a corresponding Q-learning category. In this manner, a Q-learning category for a specific traffic pattern cluster may be associated with its own historical traffic data, including the state/action/reward history records (e.g., historical traffic data records including the observed states of the traffic signals, generated control actions for the traffic signals, and the calculated rewards), associated with the specific traffic pattern. This allows each Q-learning category to determine an optimal action based on its own historical traffic data (e.g., the historical traffic data associated with the specific traffic pattern cluster).

For example, a person, such as an operator knowledgeable in traffic analysis, may specify the number of Q-learning categories by specifying the properties that define or characterize the different traffic patterns. Examples of traffic patterns may include, without limitation, ultralow traffic, low traffic, normal traffic, heavy traffic, ultra heavy traffic, traffic jam, accident, and the like. For example, the different traffic patterns may be characterized by traffic rates, such as the number of motorized users (e.g., the number of vehicles) at or coming into an intersection at a particular time slot, the number of non-motorized users at or coming into the intersection at a particular time slot, and/or the like, including combinations thereof, or range of traffic rates. Additionally or alternatively, the different traffic patterns may be characterized by queue lengths, average motorized traffic waiting time at the intersection, non-motorized traffic waiting time at the intersection, and/or the like. Historical traffic data may then be analyzed to determine the different traffic pattern clusters (e.g., the different Q-leaning categories) based on the thresholds. The specified thresholds may determine the number of different traffic patterns, which in turn determines the number of traffic pattern clusters and corresponding Q-learning categories. In some embodiments, the operator may specify the number of Q-learning categories based on a policy or policies. In some embodiments, the thresholds may be automatically determined, for example, based on heuristic analysis of the historical traffic data.

In some embodiments, historical traffic data may be clustered into traffic pattern clusters based on queue lengths (e.g., motorized user queue lengths and/or non-motorized user queue lengths) at each intersection as the queue lengths vary over time (e.g., vary over each time slot). Data in the same traffic pattern cluster may exhibit similar properties. For example, the lengths of queues in the same traffic pattern cluster may have the same or similar lengths. Clustering may identify the change in queue lengths (e.g., potentially substantial change in queue lengths to differentiate one traffic pattern cluster from another traffic pattern cluster), and divide the queue lengths into different traffic pattern clusters (e.g., cluster groups) based on the queue lengths. A clustering technique, such as "Clustering by passing messages between data points," Frey, Brendan J., and Dueck, Dilbert, Science 315.5814 (16 Feb. 2007): 972-6, may be used to cluster the historical traffic data.

In some embodiments, each traffic pattern cluster may be associated with an event. An event may be any occurrence that may have an impact on traffic. For example, the traffic data when a sporting event, such as a football game, a soccer match, and/or the like, is occurring may be different from traffic data when the sporting event is not occurring. As another example, the traffic data on weekday mornings that indicate a morning traffic jam event may be due to people going to work. As still another example, the traffic data when a concert is occurring may be different from traffic data when the concert is not occurring. Once the historical traffic data is clustered into different traffic pattern clusters, a traffic pattern cluster may be associated with an event based on traffic data observed during the occurrence of past events. For example, historical traffic data of a traffic pattern cluster may be compared to traffic data that occurred during an event, and the traffic pattern cluster may be associated with the event based on the similarity between the historical traffic data of the traffic pattern cluster and the traffic data that occurred during the event. Each event (e.g., traffic pattern cluster) may be assigned to a corresponding Q-leaning category.

In some embodiments, the agent may test for false positives in the change of traffic patterns and/or events before changing Q-learning categories. Observed traffic data (e.g., observed state of an intersection) may incorrectly indicate that a particular traffic pattern and/or event is occurring. For example, a first traffic pattern (e.g., first traffic pattern cluster) may be currently occurring, and the agent may be applying a first Q-learning category corresponding to the first traffic pattern (e.g., first traffic pattern cluster). While the first traffic pattern (e.g., first traffic pattern cluster) is occurring, traffic data may be observed that falsely indicates a change to a second traffic pattern (e.g., a second traffic pattern cluster), quickly followed by observance of traffic data associated or consistent with the first traffic pattern (e.g., first traffic pattern cluster). In this instance, the agent may unnecessarily switch from the current first Q-learning category to a second Q-learning category corresponding to the second traffic pattern (e.g., second traffic pattern cluster), and then quickly switch back to the first Q-learning category. Switching to a Q-learning category based on observed traffic data that are false positives may cause unnecessary and/or frequent Q-learning category changes. In some embodiments, the agent may check to determine that a new traffic pattern cluster or new event occurred in a specific number of consecutive time slots before changing Q-learning categories. In some embodiments, the agent may check to determine that a new traffic pattern cluster or new event occurred in at least a certain percentage or number of a specific number of consecutive time slots before changing Q-learning categories. In some embodiments, the specific number of consecutive time slots may vary or be determined based on the frequency of the occurrence of the traffic pattern cluster that corresponds to the new traffic data (e.g., based on how often the traffic pattern cluster that corresponds to the new traffic data occurred in the past).

In some embodiments, in the instance of a single Q-learning category, the agent may vary the learning rate of Q-learning. The learning rate determines to what extent the newly observed traffic data overrides the older traffic data in learning the action-value function. A learning rate of 0 causes Q-learning to not learn anything (e.g., newly observed traffic data is not considered), while a learning rate of 1 causes Q-learning to consider only the newly observed traffic data. Traffic data may be categorized into different traffic patterns, and the agent may vary the learning rate based on the frequency of traffic pattern changes (e.g., frequency of change in the traffic pattern). For example, if the traffic pattern is frequently changing, the agent may increase the learning rate (e.g., set the learning rate closer to 1) so that Q-learning considers more of the recent traffic data. Conversely, if the traffic pattern is not changing but remaining the same over a long period of time (e.g., many time slots), the agent may gradually decrease the learning rate so that Q-learning considers more of the historical traffic data.

In some embodiments, the agent may transmit or provide its traffic data (e.g., traffic data of the intersection) to one or more neighbor agents (e.g., agents that control neighbor intersections). This allows the neighbor agents to incorporate traffic data of this intersection in generating control actions for the traffic signals at the neighbor intersections. Additionally or alternatively, the agent may transmit or provide its traffic data to a central controller for use by the central controller and/or dissemination by the central controller, for example, to other agents. This allows for the propagation and use of traffic data of one intersection to one or more agents at other intersections.

In some embodiments, the agent may incorporate traffic data of one or more neighbor intersections in generating the control actions for the traffic signals at the intersection. For example, a neighbor agent (e.g., an agent controlling a neighbor intersection) may transmit traffic data of the neighbor intersection for use by the agent. Additionally or alternatively, a coordinator system may transmit or provide traffic data, such as real-time traffic statistics, historical traffic statistics, etc., of one or more intersections for use by the agent. Integration of neighboring intersection traffic data, including traffic data of larger geographical areas, may allow the agent to coordinate the control with different agents to improve traffic signal control efficiency.

In some embodiments, the coordinator system may transmit or provide motorized user route information and/or non-motorized user route information for use by the agent in generating the control actions. For example, people may be encouraged (e.g., provided certain benefits, such as reduced travel time due to traffic light control in their favor) to provide and share their route information to improve their travel experience. The coordinator system may then collect this information from, for example, mobile applications, cell phones, global positioning system (GPS) units, vehicle navigation systems, etc., of these users. The coordinator system may use traffic data of one or more intersections to determine improved routes for some or all of the people who have shared their route information. Additionally or alternatively, the coordinator system may provide some or all of the collected user information to the agents for use in generating the control actions.

In some embodiments, the coordinator system may receive information regarding intended destinations from self-driving (autonomous) vehicles. Using this information, the coordinator system may recommend candidates routes to the intended destinations to the self-driving vehicles. Additionally or alternatively, the coordinator system may share the route information with the agents to optimize the traffic flow.

FIG. 1 illustrates selected components of an intersection 100 controlled by traffic signals, arranged in accordance with at least some embodiments described herein. Intersection 100 is a four-way, +-shaped intersection, and includes traffic signals 102a, 102b, 102c, and 102d (collectively referred to herein as traffic signals 102), crosswalk signals 104a, 104b, 104c, 104d, 104e, 104f, 104g, and 104h (collectively referred to herein as crosswalk signals 104), and sensors 106a and 106b (collectively referred to herein as sensors 106). The number of components depicted in intersection 100 is for illustration, and one skilled in the art will appreciate that there may be a different number of traffic signals 102, crosswalk signals 104, and sensors 106. As depicted, intersection 100 is coupled to an agent 108 whose task is to control the flow of traffic through intersection 100.

Traffic signals 102 are traffic signals that direct the flow of motorized traffic through intersection 100. For example, traffic signal 102a may direct the flow of motorized users in the east-west direction, traffic signal 102b may direct the flow of motorized users in the south-north direction, traffic signal 102c may direct the flow of motorized users in the west-east direction, and traffic signal 102d may direct the flow of motorized users in the north-south direction. Crosswalk signals 104 are traffic signals that direct the flow of non-motorized traffic through intersection 100. For example, crosswalk signals 104a and 104b may direct the flow of non-motorized users in the east/west direction on the north side of intersection 100, crosswalk signals 104c and 104d may direct the flow of non-motorized users in the north/south direction on the east side of intersection 100, crosswalk signals 104e and 104f may direct the flow of non-motorized users in the east/west direction on the south side of intersection 100, and crosswalk signals 104g and 104h may direct the flow of non-motorized users in the north/south direction on the west side of intersection 100.

Sensors 106 may be configured to autonomously detect the presence of motorized and non-motorized users at or approaching intersection 100. In some embodiments, sensors 106 may be video cameras that are configured to acquire images of intersection 100 from which motorized user presence and non-motorized user presence may be determined. The images may be classified as motorized user presence data, non-motorized presence data, or both. The acquired images may be provided to agent 108 for processing. Agent 108 is further described below in conjunction with FIG. 3. In some embodiments, at least some of sensors 106 may be air quality monitors, metal detectors, infrared detectors, crosswalk buttons, etc.

Figure 2:
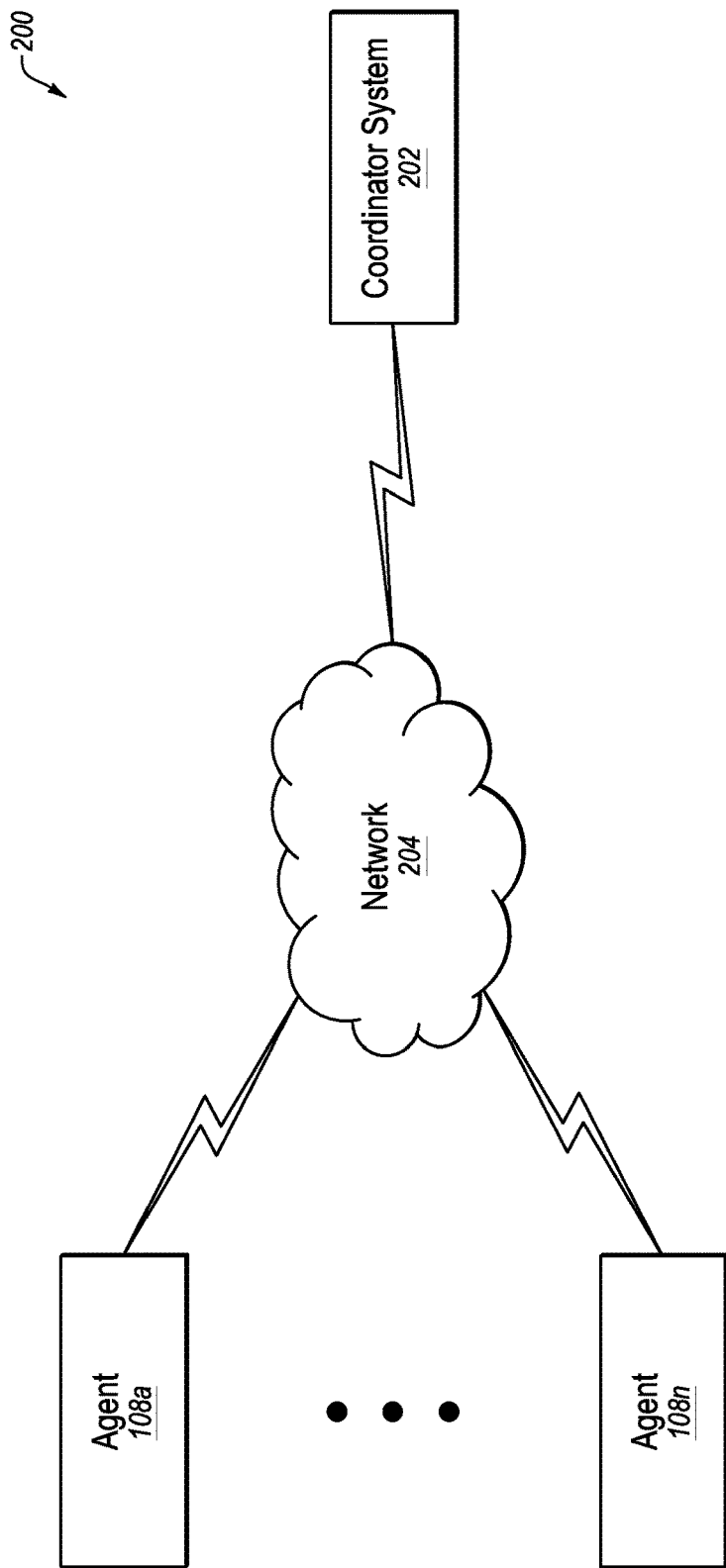
FIG. 2 illustrates an overview of an environment and selected devices in the environment.

FIG. 2 illustrates an overview of an environment 200 and selected devices in environment 200, arranged in accordance with at least some embodiments described herein. Environment 200 may include one or more agents 108a-108n, further described below in conjunction with FIG. 3. Agents 108a-108n may be individually referred to herein as agent 108 or collectively referred to herein as agents 108. The number of agents depicted in environment 200 is for illustration, and one skilled in the art will appreciate that there may be a different number of agents 108. Agents 108a-108n are illustrated as operating in a networked environment using logical connections to each other and one or more remote computing systems, e.g., a coordinator system 202, through a network 204. Network 204 can be a local area network, a wide area network, the Internet, and/or other wired or wireless networks.

Figure 3:
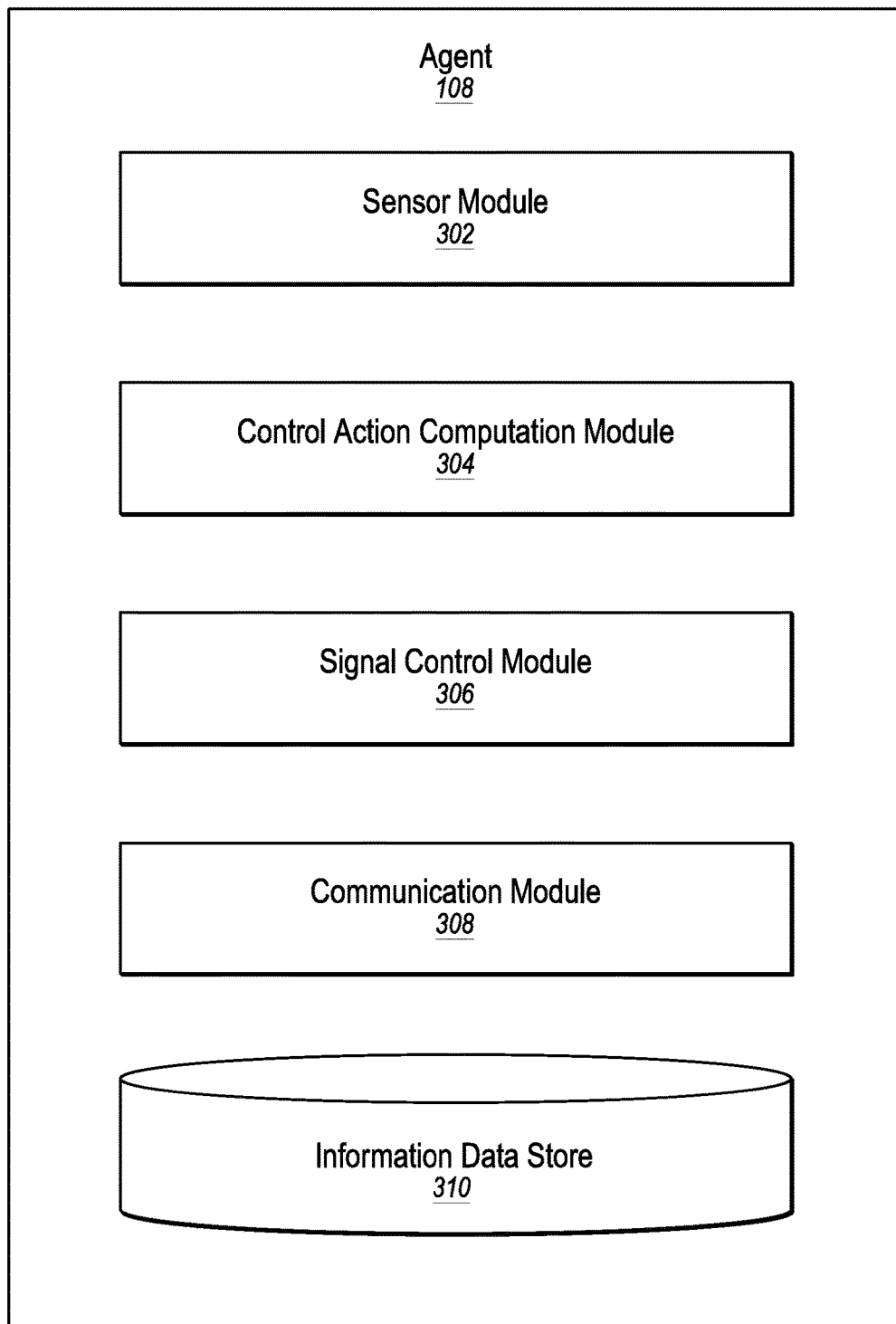
FIG. 3 illustrates selected components of an example agent.

FIG. 3 illustrates selected components of agent 108, arranged in accordance with at least some embodiments described herein. As depicted, agent 108 includes a sensor module 302, a control action computation module 304, a signal control module 306, a communication module 308, and an information data store 310. In various embodiments, additional components (not illustrated) or a subset of the illustrated components can be employed without deviating from the scope of the claimed technology.

Sensor module 302 may be configured to communicate with the sensors deployed at the intersection to receive (obtain) sensor data from the sensors. For example, in instances where the sensors are video cameras, sensor module 302 may receive the images and/or video feeds from the coupled sensors. In some embodiments, sensor module 302 may be configured to control the coupled sensors. For example, sensor module 302 may send the sensors instructions to operate the sensors (e.g., power on, power off, reboot, positioning and/or movement instructions, etc.).

Control action computation module 304 may be configured to control the traffic signals deployed at the intersection. For example, control action computation module 304 may generate a control action that directs the operation of the traffic signals at the intersection based on the sensor data obtained by sensor module 302. Accordingly, control action computation module 304 is able to generate control actions for the traffic signals (the traffic signals for motorized traffic and the traffic signals for non-motorized traffic) that account for the presence of motorized traffic and non-motorized traffic at the intersection. In some embodiments, control action computation module 304 may apply one or more conditions in generating the control actions for the traffic signals. Additionally or alternatively, control action computation module 304 may incorporate traffic data from one or more other agents (e.g., agents controlling other intersections) in generating the control actions for the traffic signals. Additionally or alternatively, control action computation module 304 may incorporate historical traffic data of the intersection and/or of one or more other intersections in generating the control actions for the traffic signals.

In some embodiments, control action computation module 304 may apply Q-learning to generate the control actions for the traffic signals that consider both motorized users and non-motorized users at an intersection. As discussed earlier, Q-learning can be used to determine an optimal action-selection policy for any given (finite) Markov decision process (MDP). Q-learning works by learning an action-value function that provides an expected utility of taking a given action (e.g., generating a given control action) in a given state (e.g., given state of the traffic signals) and following the optimal policy thereafter.

Figure 4:
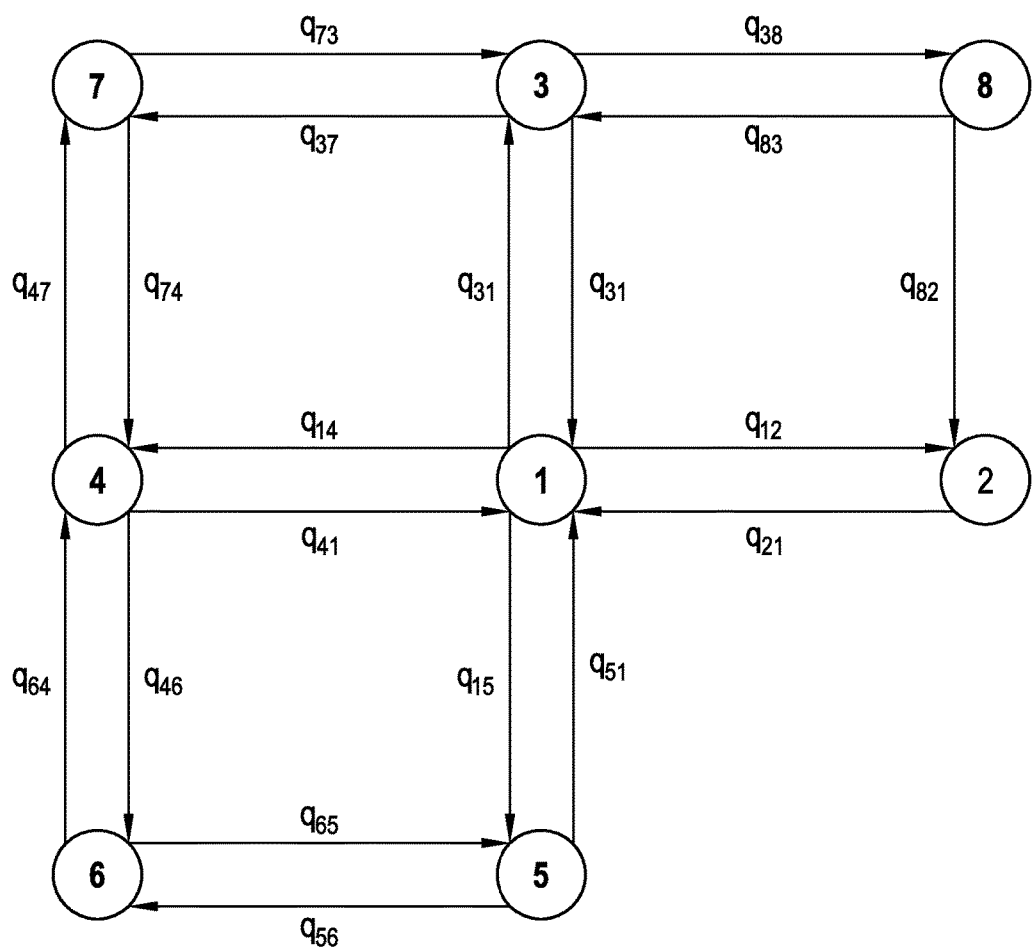
FIG. 4 illustrates an example directed graph corresponding to a segment of an example transportation network.

A transportation network (e.g., network of roads including intersections) may be abstracted into a directed graph. FIG. 4 illustrates an example directed graph corresponding to a segment of an example transportation network. Each intersection may be represented by a vertex in the directed graph, and a road may correspond to an edge in the directed graph. The flows (e.g., directed connections) may represent traffic, such as vehicular traffic, where $q_{ij}$ is the queue length from intersection i to intersection j. For example, as depicted in the directed graph, $q_{41}$ is the queue length from intersection 4 to intersection 1.

As an example, assume that the motorized users are vehicles, and the non-motorized users are pedestrians. Then, the various states of the traffic signals deployed at the intersection may be based on the number of vehicles and the number of pedestrians in the various queues in the incoming directions to the intersection. Thus, for any intersection i, the state of the traffic signals at the intersection is a set that contains all lengths of the queues, and may be represented as $$S^t_{i,d} = \{q^t_{1i,d}, q^t_{2i,d}, \ldots, q^t_{ji,d}, m^t_{1i,d,L}, m^t_{1i,d,R}, \ldots, m^t_{ji,d,L}, m^t_{ji,d,R}\}; j \in N_i$$

where $S^t_{i,d}$ is the state of the traffic signals at intersection i, at day d and time t; $q^t_{ji,d}$ is the queue length for vehicles from intersection j to i, at day d and time t; $m^t_{ji,d,L}$ is the queue length for pedestrians at the left side from intersection j to i, at day d and time t; and $m^t_{ji,d,R}$ is the queue length for pedestrians at the right side from intersection j to i, at day d and time t. $S^t_{i,d}$ can vary for different t's since $q^t_{ji,d}$, $m^t_{ji,d,L}$, and $m^t_{ji,d,R}$ are subjected to stochastic process.

Figure 5:
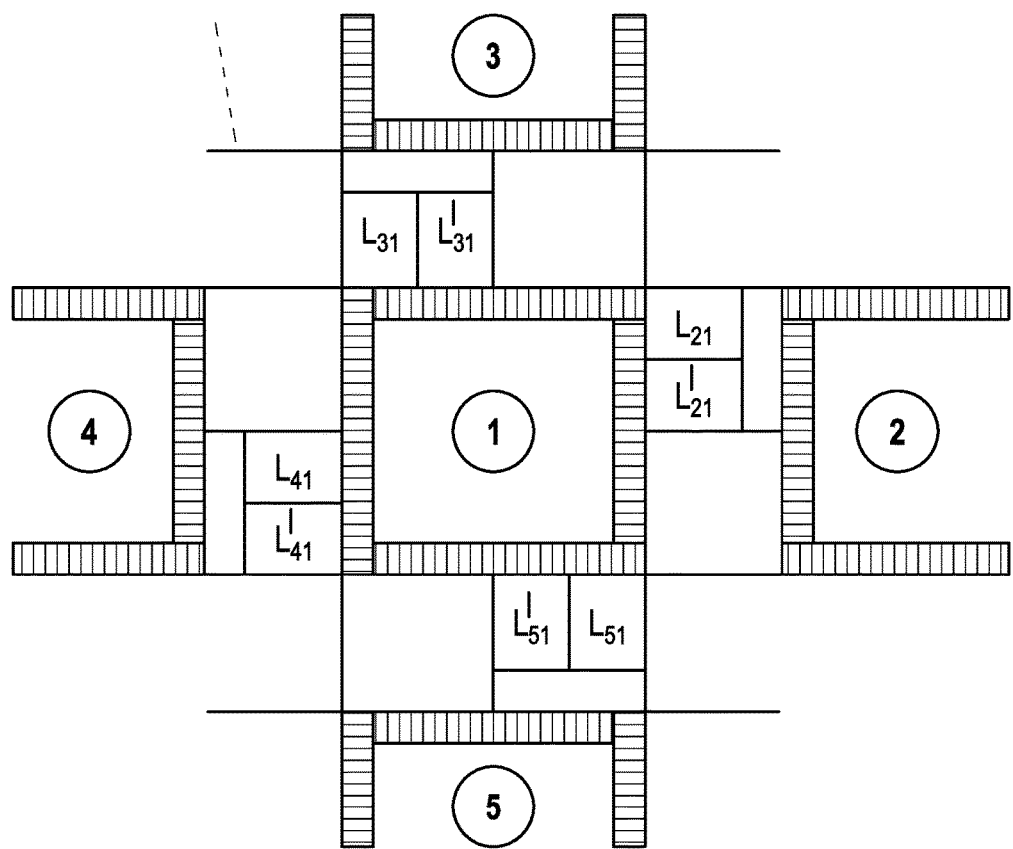
FIG. 5 illustrates a four-way, +-shape intersection.
Figure 6:
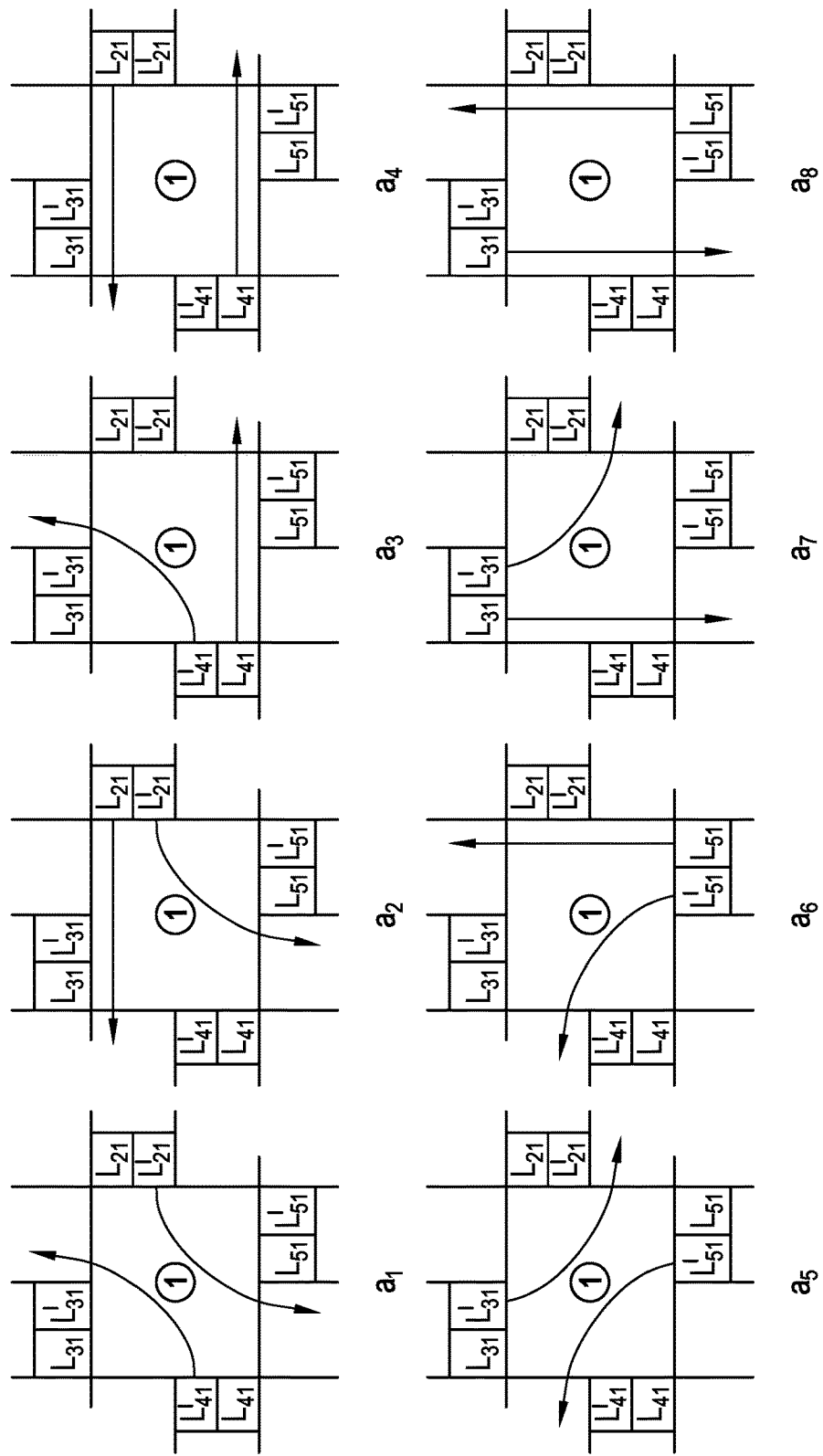
FIG. 6 illustrates an example action set for the four-way, +-shape intersection of FIG. 5.

For an action, a, the action set of possible actions, A, for the traffic signals at an intersection may be designed based on the traffic rules applicable to the location of the intersection. For an example four-way, +-shaped intersection as illustrated in FIG. 5, the action set may include eight possible actions, |A|=8, as dictated by the applicable traffic rules. Accordingly, only $\{a_i \in A | i=1, 2, \ldots, 8\}$ actions may be chosen at any time slot, as illustrated by the example action set for the four-way, +-shape intersection (FIG. 6). As depicted in FIG. 6, $L_{ij}$ is the traffic signal that controls the flow of traffic from region i to region j, and $L'_{ij}$ is the left turn traffic signal that controls the flow of traffic from region i to region j. Note that the intersection itself is represented as region 1. Then the possible actions (e.g., the control actions for the traffic signals) may be represented as

|     | $L_{21}$ | $L'_{21}$ | $L_{41}$ | $L'_{41}$ | $L_{31}$ | $L'_{31}$ | $L_{51}$ | $L'_{51}$ |
|-----|------|-------|------|-------|------|-------|------|-------|
| $a_1$ | 0 | 1 | 0 | 1 | 0 | 0 | 0 | 0 |
| $a_2$ | 1 | 1 | 0 | 0 | 0 | 0 | 0 | 0 |
| $a_3$ | 0 | 0 | 1 | 1 | 0 | 0 | 0 | 0 |
| $a_4$ | 1 | 0 | 1 | 0 | 0 | 0 | 0 | 0 |
| $a_5$ | 0 | 0 | 0 | 0 | 0 | 1 | 0 | 1 |
| $a_6$ | 0 | 0 | 0 | 0 | 0 | 0 | 1 | 1 |
| $a_7$ | 0 | 0 | 0 | 0 | 1 | 1 | 0 | 0 |
| $a_8$ | 0 | 0 | 0 | 0 | 1 | 0 | 1 | 0 | where "1" represents green light, and "0" represents red light.

Figure 7:
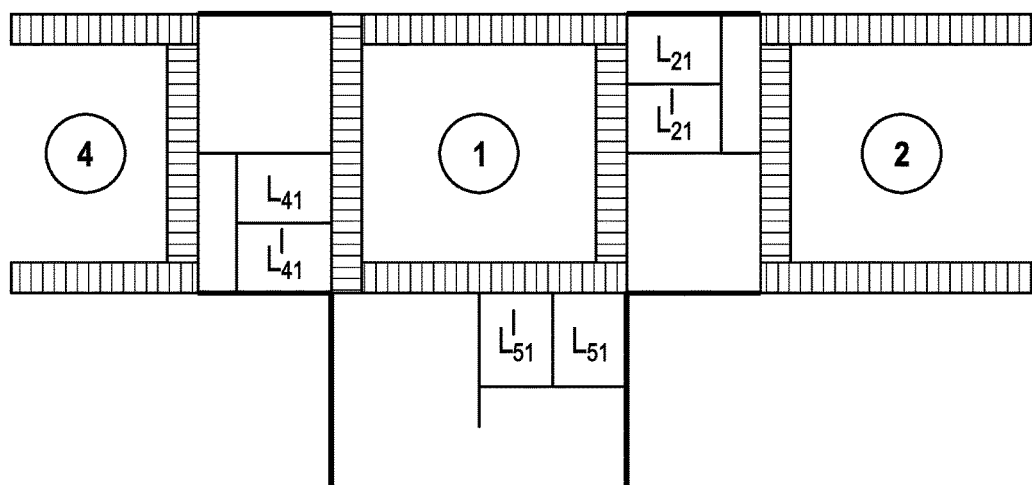
FIG. 7 illustrates a three-way, T-intersection.
Figure 8:
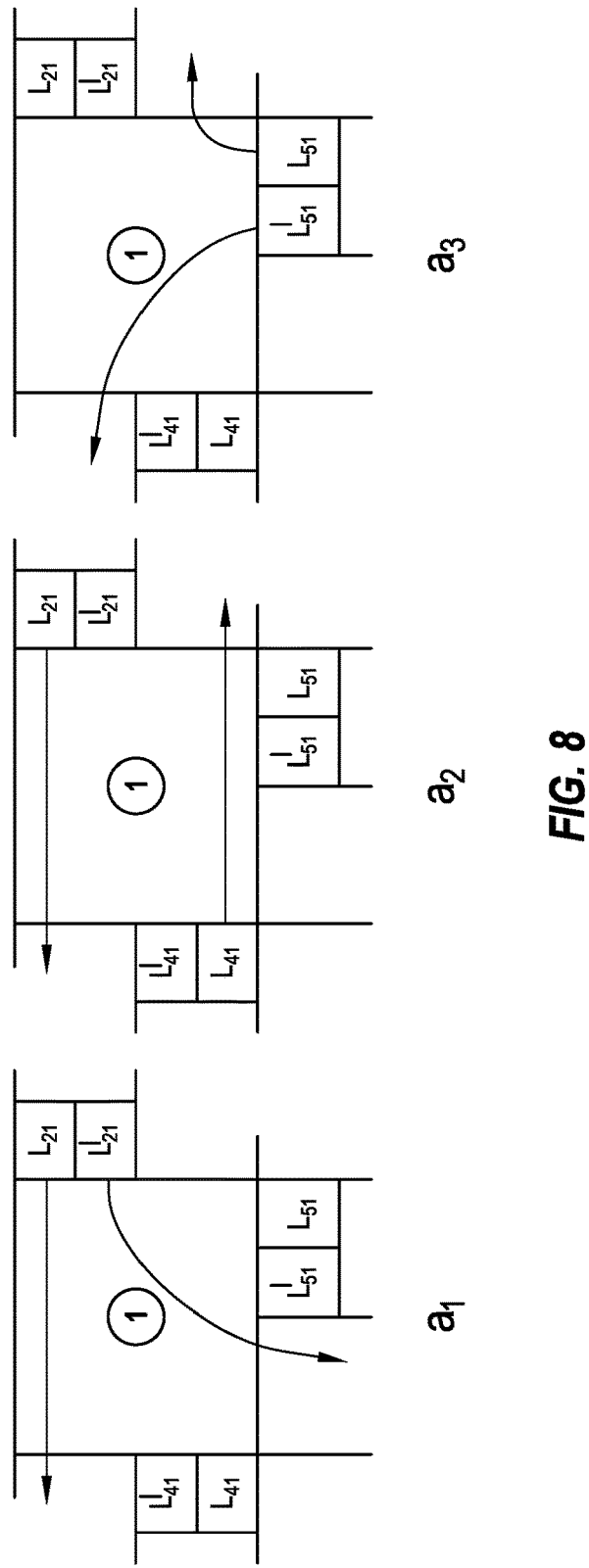
FIG. 8 illustrates an example action set for the three-way, T-shape intersection of FIG. 7.

Similarly, for an example three-way, T-intersection as illustrated in FIG. 7, the action set may include three possible actions, |A|=3, as dictated by the applicable traffic rules. Accordingly, only {$a_i \in A | i=1, 2, 3$} actions may be chosen at any time slot, as illustrated by the example action set for the three-way, T-shape intersection (FIG. 8). As depicted in FIG. 8, $L_{ij}$ is the traffic signal that controls the flow of traffic from region i to region j, and $L'_{ij}$ is the left turn traffic signal that controls the flow of traffic from region i to region j. Note that the intersection itself is represented as region 1. Then the possible actions (e.g., the control actions for the traffic signals) may be represented as

|       | $L_{21}$ | $L'_{21}$ | $L_{41}$ | $L'_{41}$ | $L_{51}$ | $L'_{51}$ |
|-------|----------|-----------|----------|-----------|----------|-----------|
| $a_1$ | 1        | 1         | 0        | 0         | 0        | 0         |
| $a_2$ | 1        | 0         | 1        | 0         | 0        | 0         |
| $a_3$ | 0        | 0         | 0        | 0         | 1        | 1         | where "1" represents green light, and "0" represents red light.

The time slot can be set based on operational policy. For example, the time slot can be set to a relatively longer time duration (e.g., 5 to 10 seconds) to avoid having to frequently change the traffic signals. Conversely, the time slot can be set to a relatively shorter time duration (e.g., 1 second) to obtain a faster Q-learning algorithm convergence. Thus, for a time period T, the probabilities for the actions may be represented as $$P\{a=a_i\}=N(a_i)/\Sigma_{i=1:|A|}N(a_i)$$

where $a_i$ is the action i in the set |A|, and $N(a_i)$ is the occurrence of ai in the time period T. For the +-shape intersection example above, suppose a sequence of actions for time period T to be

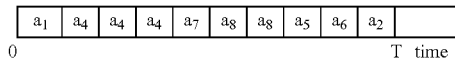

then the derived probabilities for each action within time period T may be

|             | $a_1$ | $a_2$ | $a_3$ | $a_4$ | $a_5$ | $a_6$ | $a_7$ | $a_8$ |
|-------------|-------|-------|-------|-------|-------|-------|-------|-------|
| P {a = $a_i$} | 1/10  | 1/10  | 0     | 3/10  | 1/10  | 1/10  | 1/10  | 1/5   |

In the example, suppose that the objective is to minimize the length of all queues, both motorized and non-motorized user queues, at the intersection. Then, the immediate cost/reward at intersection i may be represented as $$R^t_{i,d}(a^t_{i,d},a^t_{j,d},S^t_{i,d},S^t_{j,d},W^t_{i,d})=(1/|N_i|)(w^t_{1,d}\Sigma_{j\in Ni}q^t_{ji,d}+w^t_{2,d}\Sigma_{j\in Ni}((1/|N_j|)\Sigma_{k\in Nj}q^t_{kj,d})+(w^t_{3,d}/2)\Sigma_{j\in Ni}(m^t_{ji,d,L}+m^t_{ji,d,R})) \quad [1]$$

where $R^t_{i,d}$ is the reward at intersection i, at day d and time t; $a^t_{i,d}$ is the action at intersection i, at day d and time t; $a^t_{j,d}$ is the action at intersection j, at day d and time t; $S^t_{i,d}$ is the state at intersection i, at day d and time t; $S^t_{j,d}$ is the state at intersection j, at day d and time t; $w^t_{1,d}$ is the weight to present the local vehicular queues at intersection i; $w^t_{2,d}$ is the weight to present the neighborhood vehicular queues at the neighbors ($j \in N_i$) of intersection i; $w^t_{3,d}$ is the weight to present the total pedestrian queues at intersection i; $|N_i|$ is the number of neighboring intersections of intersection i; $q^t_{ji,d}$ is the queue length from intersection j to intersection i, at day d and time t; $m^t_{ji,d,L}$ is the queue length for pedestrians at the left side from intersection j to i, at day d and time t; and $m^t_{ji,d,R}$ is the queue length for pedestrians at the right side from intersection j to i, at day d and time t. As mentioned above, Q-learning works by learning an action-value function that provides an expected utility of taking a given action (e.g., generating a given control action) in a given state (e.g., given state of the traffic signals) and following the optimal policy thereafter. The Q value calculation can be expressed as $$Q(S^t_{i,d}, a^t_{i,d})=(1-\alpha)Q(S^t_{i,d},a^t_{i,d})+\alpha(R^t_{i,d}+\gamma \max_a Q(S^{t+1}_{i,d},a^{t+1}_{i,d})) \quad [2]$$

where Q ($S^t_{i,d}$, $a^t_{i,d}$) is the Q value for a given state-action pair ($S^t_{i,d}$, $a^t_{i,d}$); $R^t_{i,d}$ is the reward at intersection i, at day d and time t, as expressed by equation [1]; $a^t_{i,d}$ is the action at intersection i, at day d and time t; $S^t_{i,d}$ is the state at intersection i, at day d and time t; $\alpha$ is the learning rate ($0 \leq \alpha \leq 1$), and $\gamma$ is the discount factor ($0 \leq \gamma \leq 1$).

In equation [1] above, $\Sigma_{j\in Ni} q^t_{ji,d}$ is the incoming vehicular queues from intersection j to intersection i; $\Sigma_{j\in Ni}((1/|N_j|)\Sigma_{k\in Nj} q^t_{kj,d})$ is the total vehicular queues at all neighbor intersection j's, including the outgoing vehicular traffic from intersection i to intersection j; and $\Sigma_{j\in Ni}(m^t_{ji,d,L}+m^t_{ji,d,R})$ is the total pedestrian queues at intersection i. $|N_i|$ is 4 for a four-way, +-shaped intersection, and $|N_i|$ is 3 for a three-way, T-intersection. In equation [1], the three additive terms $\Sigma_{j\in Ni} q^t_{ji,d}$, $\Sigma_{j\in Ni}((1/|N_j|)\Sigma_{k\in Nj} q^t_{kj,d})$, and $\Sigma_{j\in Ni}(m^t_{ji,d,L}+m^t_{ji,d,R})$, have associated respective weights $w^t_{1,d}$, $w^t_{2,d}$, and $w^t_{3,d}/2$, where the weight correlates to the priority assigned to the additive term. That is, the higher the priority, the higher the weight. The total of the weights at the neighboring intersections at day d and time t, $W^t_d$, sum up to 1. Accordingly, for the three-way, T-intersection, $W^t_d=\{w^t_{1,d}, w^t_{2,d}, w^t_{3,d}\}$, where $w^t_{1,d}+w^t_{2,d}+w^t_{3,d}=1$.

According to equation [1], the reward, $R^t_{i,d}$, is the queue lengths at intersection i, at day d and time t. Accordingly, as the objective is to minimize the lengths of all queues at intersection i, an action that minimizes $R^t_{i,d}$ may be chosen.

As discussed above, in some embodiments, historical traffic data may be incorporated in the determination of the actions. For example, an autoregressive integrated moving average (ARIMA) model incorporated to calculate estimated instantaneous rewards based on historical traffic data at intersection i may be represented as $$R^t_{i,d}=\Sigma_{n=1:p}\alpha_n R^t_{i,d-n}+\varepsilon_{i,d}+\Sigma_{n=1:q}\theta_n\varepsilon^t_{i,d-n}$$

where $R^t_{i,d}$ is the rewards at intersection i, at day d and time t; n is the lag operator; p is the number of autoregressive terms (e.g., the number of days of historical traffic data to consider); q is the number of days for the moving-average terms; $\alpha_n$ are the parameters (e.g., weights) of the autoregressive part of the model; $\theta_n$ are the parameters (e.g., weights) of the moving-average part of the model; and $\varepsilon^t_{i,d}$ are the error terms (e.g., the variance of queue lengths at the intersection) at intersection i of day d. Again, as the objective is to minimize the lengths of all queues at intersection i, an action that minimizes $R^t_{i,d}$ may be chosen.

In some embodiments, traffic data of an intersection may be broadcast to neighbor intersections. Accordingly, traffic data from neighboring intersections may be incorporated to determine the actions at a particular intersection. Suppose the traffic data is queue lengths, then at intersection j, the traffic data from neighboring intersections may be represented as $$T^t_j=\Sigma_{k\in Nj}q^t_{kj,d}/|N_j|$$

where $T^t_j$ is the average vehicular queue length at time t from all neighbor intersections of intersection j; $q^t_{kj,d}$ is the queue length for vehicles from intersection k to j, at day d and time t; and $|N_j|$ is the number of neighboring intersections of intersection j. It follows that the sum of all the neighbors' average queue lengths is $\Sigma T^t_j$, which can replace the middle additive term in equation [1] above.

In some embodiments, one or more conditions may be applied in determining an action. In normal operation, it may be that certain actions cannot follow other actions. For example, in the four-way, +-shaped intersection example above, the conditions on the actions may specify that, if the action at day d and time t is 1 ($a^t_{i,d}$, i∈1), then the action at day d at time t+1 cannot be 5, 6, 7, or 8 ($a^{t+1}_{i,d}$, j∈{5, 6, 7, 8}); if the action at day d and time t is 5 ($a^t_{i,d}$, i∈5), then the action at day d at time t+1 cannot be 1, 2, 3, or 4 ($a^{t+1}_{i,d}$, j∈{1, 2, 3, 4}); if the action at day d and time t is 2 or 3 ($a^t_{i,d}$, i∈{2, 3}), then the action at day d at time t+1 cannot be 5 ($a^{t+1}_{i,d}$, j∈{5}); and if the action at day d and time t is 5 or 7 ($a^t_{i,d}$, i∈{5, 7}), then the action at day d at time t+1 cannot be 1 ($a^{t+1}_{i,d}$, j∈{1}). As equation [1] above does not account for any conditions on actions, one solution to account for the conditions may be to sort the Q values in ascending order (e.g., priority queue), then select the smallest one that satisfies the conditions. Another solution may be to assign the rewards to a very large number, e.g., $R^t_d(a^t_{i,d}, a^t_{j,d}, s^t_d)$=MAX, if any of the conditions is not satisfied, where $R^t_d$ is the reward at day d and time t, $a^t_{i,d}$ is the action at day d and time t, and $s^t_d$ is the state at day d and time t. Assigning the rewards to a very large number will result in the action not being selected.

An example of another condition may be that a traffic signal that is directing pedestrians to cross an intersection should not turn red while the pedestrians are crossing the intersection. One solution to account for this condition may be to set the time slot to a longer duration to provide sufficient time for pedestrians to cross the intersection. Another solution may be to maintain the current time slot (e.g., the relatively short duration), but change actions only when no pedestrian is crossing the intersection. For example, sensors deployed at the intersections may be able to provide information that may be used to determine whether a pedestrian is crossing the intersection. Another solution may be to not change the action for a specific number of time slots if a pedestrian is crossing the intersection.

Signal control module 306 may be configured to communicate with the traffic signals at the intersection to control (direct) operation of the traffic signals based on the control action generated by control action computation module 304. For example, signal control module 306 may control operation of the traffic signals by transmitting instructions (e.g., electrical signals or other signals depending on the type of traffic signal, etc.) that direct the operation of the traffic signals. Communication module 308 may be configured to couple to one or more remote computing devices or computing systems, such as, by way of example, other remote agents 108, coordinator system 202, etc. Accordingly, communication module 308 may facilitate communication by agent 108 with one or more external components. For example, control action computation module 304 may utilize communication module 308 to communicate with a neighboring agent, for example, to receive traffic data of the neighboring intersection. In some embodiments, sensor module 302 and/or signal control module 306 may utilize communication module 308 to communicate with the sensors and/or the traffic signals, respectively. Information data store 310 may be configured to store data, such as, by way of example, traffic data, sensor data, or other data that may be used by agent 108. Information data store 310 may be implemented using any computer-readable storage media suitable for carrying or having data or data structures stored thereon.

Figure 9:
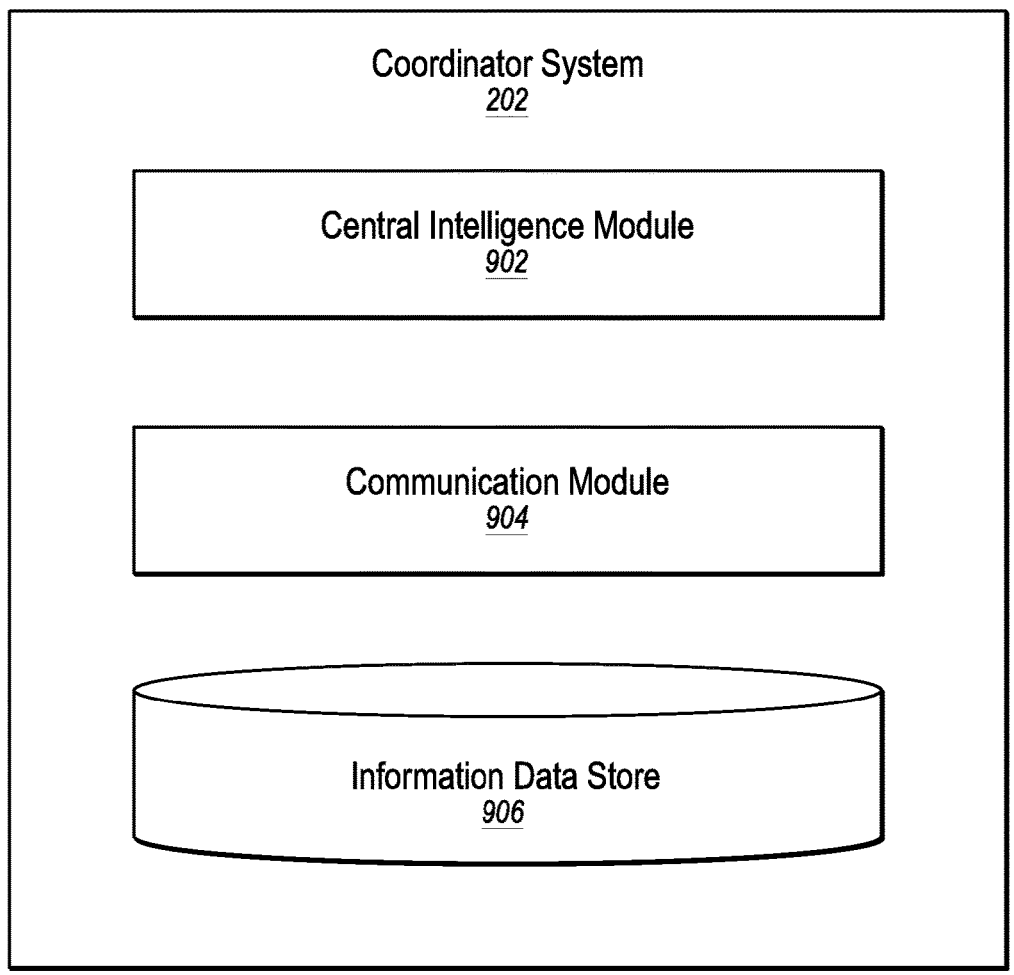
FIG. 9 illustrates selected components of an example coordinator system.

FIG. 9 illustrates selected components of coordinator system 202, arranged in accordance with at least some embodiments described herein. As depicted, coordinator system 202 includes a central intelligence module 902, a communication module 904, and an information data store 906. In various embodiments, additional components (not illustrated) or a subset of the illustrated components can be employed without deviating from the scope of the claimed technology.

Central intelligence module 902 may be configured to communicate with one or more agents 108 to receive (obtain) traffic data (e.g., current traffic data, historical traffic data, sensor data, operating data, etc.) from agents 108. Central intelligence module 902 may also provide traffic data to one or more agents 108, for example, for use in generating control actions and/or otherwise controlling the respective intersections.

In some embodiments, central intelligence module 902 may be configured to provide route information for use by one or more agents. For example, motorized users and/or non-motorized users may provide their travel route information. Central intelligence module 902 may process the travel route information to determine the travel route information relevant to a geographic area (e.g., one or more intersections, etc.). Central intelligence module 902 can then provide the agent or agents controlling the one or more intersections the relevant travel route information for use by the agent or agents, for example, to generate the control actions for the traffic signals.

Communication module 904 may be configured to couple to one or more remote computing devices or computing systems, such as, by way of example, one or more agents, one or more other coordinator systems, one or more traffic control systems, sources of remote data, etc. Similar to communication module 308 discussed above, communication module 904 facilitates communication by coordinator system 202 with one or more external components. For example, central intelligence module 902 may utilize communication module 904 to communicate with an agent, for example, to receive traffic data of the intersection being controlled by the agent. Information data store 906 may be configured to store data, such as, by way of example, traffic data, motorized user data, non-motorized user data, or other data that may be used by coordinator system 202. Similar to information data store 310, information data store 906 may be implemented using any computer-readable storage media suitable for carrying or having data or data structures stored thereon.

Figure 10:
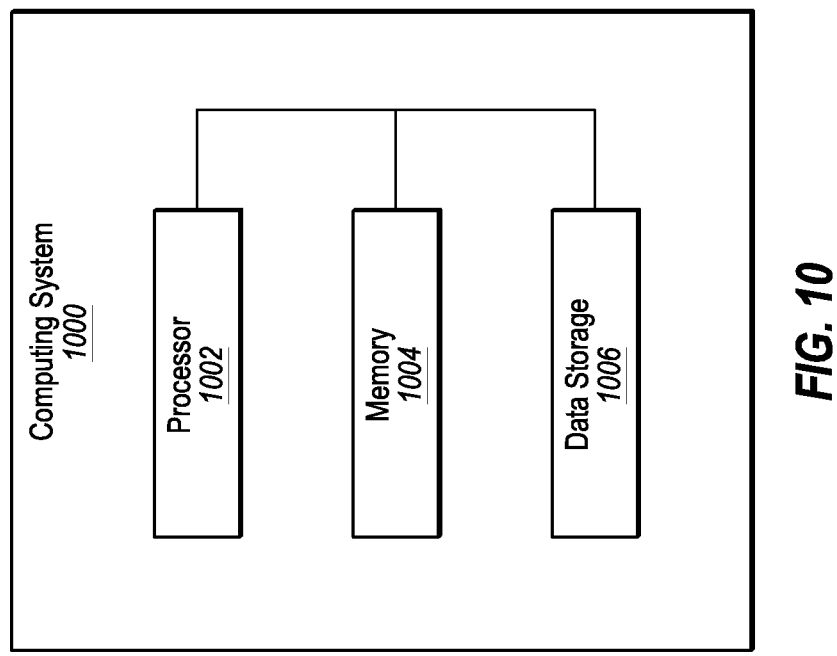
FIG. 10 illustrates selected components of an example general purpose computing system, which may be used to generate control actions for traffic signals at an intersection.

FIG. 10 illustrates selected components of an example general purpose computing system 1000, which may be used to generate control actions for traffic signals at an intersection, arranged in accordance with at least some embodiments described herein. Computing system 1000 may be configured to implement or direct one or more operations associated with some or all of the components and/or modules associated with agent 108 of FIG. 3 and/or coordinator system 202 of FIG. 9. Computing system 1000 may include a processor 1002, a memory 1004, and a data storage 1006. Processor 1002, memory 1004, and data storage 1006 may be communicatively coupled.

In general, processor 1002 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 1002 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 10, processor 1002 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 1002 may be configured to interpret and/or execute program instructions and/or process data stored in memory 1004, data storage 1006, or memory 1004 and data storage 1006. In some embodiments, processor 1002 may fetch program instructions from data storage 1006 and load the program instructions in memory 1004. After the program instructions are loaded into memory 1004, processor 1002 may execute the program instructions.

For example, in some embodiments, any one or more of the components and/or modules of agent 108 and/or coordinator system 202 may be included in data storage 1006 as program instructions. Processor 1002 may fetch some or all of the program instructions from the data storage 1006 and may load the fetched program instructions in memory 1004. Subsequent to loading the program instructions into memory 1004, processor 1002 may execute the program instructions such that the computing system may implement the operations as directed by the instructions.

Memory 1004 and data storage 1006 may include computer-readable storage media for carrying or having computer-executable instructions or data structures stored thereon. Such computer-readable storage media may include any available media that may be accessed by a general-purpose or special-purpose computer, such as processor 1002. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 1002 to perform a certain operation or group of operations.

Modifications, additions, or omissions may be made to computing system 1000 without departing from the scope of the present disclosure. For example, in some embodiments, computing system 1000 may include any number of other components that may not be explicitly illustrated or described herein.

Figure 11:
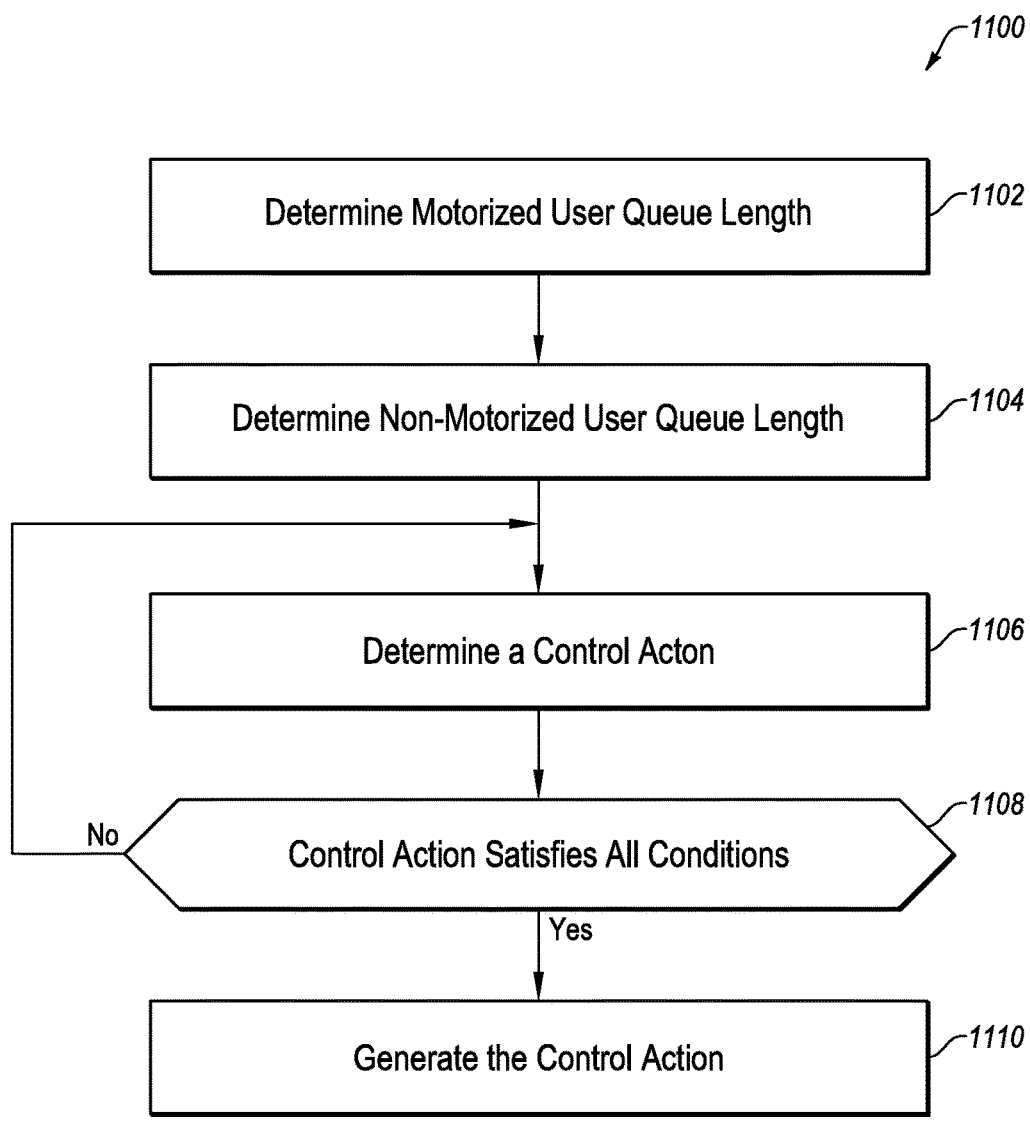
FIG. 11 is a flow diagram that illustrates an example process to generate control actions for traffic signals at an intersection based at least in part on a non-motorized user queue length that may be performed by an agent such as the agent of FIG. 3.

FIG. 11 is a flow diagram 1100 that illustrates an example process to generate control actions for traffic signals at an intersection based at least in part on a non-motorized user queue length that may be performed by an agent such as agent 108 of FIG. 3, arranged in accordance with at least some embodiments described herein. Example processes and methods may include one or more operations, functions or actions as illustrated by one or more of blocks 1102, 1104, 1106, 1108, and/or 1110, and may in some embodiments be performed by a computing system such as computing system 1000 of FIG. 10. The operations described in blocks 1102-1110 may also be stored as computer-executable instructions in a computer-readable medium such as memory 1004 and/or data storage 1006 of computing system 1000.

As depicted by flow diagram 1100, the example process to generate control actions for traffic signals at an intersection based at least in part on a non-motorized user queue length may begin with block 1102 ("Determine Motorized User Queue Length"), where an agent configured to control the traffic signals deployed at the intersection may determine the lengths of the motorized user queues at the intersection. Optionally, the agent may transmit the traffic data (e.g., the lengths of the motorized user queues), for example, to one or more neighboring agents and/or one or more traffic coordinator systems.

Block 1102 may be followed by block 1104 ("Determine Non-Motorized User Queue Length"), where the agent configured to control the traffic signals deployed at the intersection may determine the lengths of the non-motorized user queues at the intersection. Optionally, the agent may transmit the traffic data (e.g., the lengths of the non-motorized user queues), for example, to one or more neighboring agents and/or one or more traffic coordinator systems.

Block 1104 may be followed by block 1106 ("Determine a Control Action"), where the agent configured to control the traffic signals deployed at the intersection may determine an action (control action) for the traffic signals at the intersection based on the determined lengths of the motorized user queues and the non-motorized user queues. In some embodiments, the agent may incorporate historical traffic data of the intersection and/or one or more other intersections in determining the action. In some embodiments, the agent may incorporate traffic data of one or more neighboring intersections in determining the action.

Block 1106 may be followed by decision block 1108 ("Control Action Satisfies a Condition?"), where the agent configured to control the traffic signals deployed at the intersection may determine whether the action satisfies a condition (e.g., a condition placed on the operation of the traffic signals). If the agent determines that the action does not satisfy any one of the conditions, decision block 1108 may be followed by block 1106 where the agent may determine another action for the traffic signals at the intersection.

Otherwise, if the agent determines that the action satisfies all of the conditions, decision block 1108 may be followed by block 1110 ("Generate the Control Action"), where the agent configured to control the traffic signals deployed at the intersection may control the traffic signals at the intersection according to the action (e.g., cause signal control module 306 to control operation of the traffic signals in a manner consistent with the action).

Those skilled in the art will appreciate that, for this and other processes and methods disclosed herein, the functions performed in the processes and methods may be implemented in differing order. Additionally or alternatively, two or more operations may be performed at the same time.

Furthermore, the outlined actions and operations are only provided as examples, and some of the actions and operations may be optional, combined into fewer actions and operations, or expanded into additional actions and operations without detracting from the essence of the disclosed embodiments.

Figure 12:
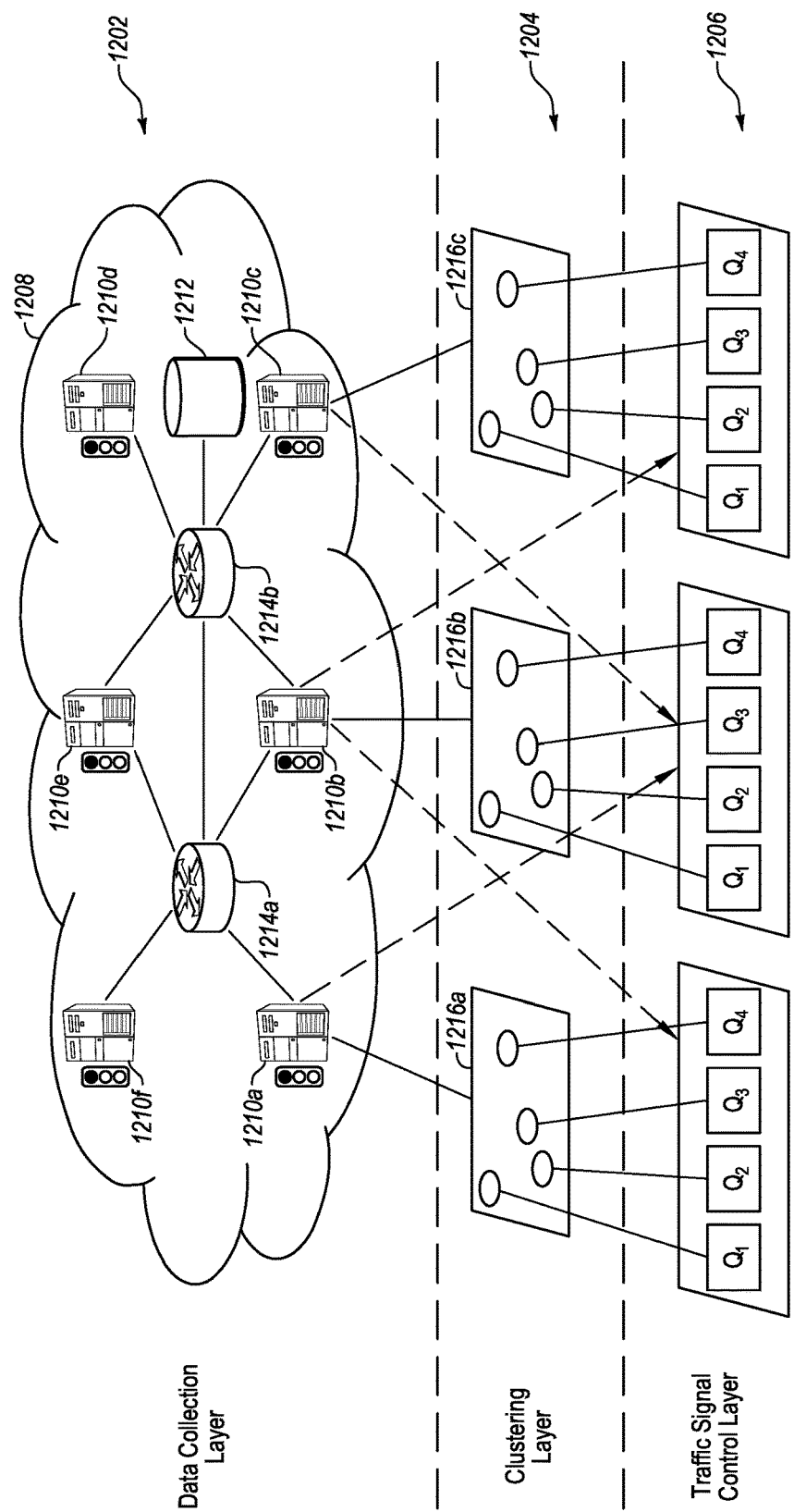
FIG. 12 illustrates an example architecture for multiple Q-learning categories.

FIG. 12 illustrates an example architecture for multiple Q-learning categories, arranged in accordance with at least some embodiments described herein. The architecture may include a data collection layer 1202, a clustering layer 1204, and a traffic signal control layer 1206. Data collection layer 1202 may include one or more computing systems operating in a networked environment 1208. As depicted, network environment 1208 may include one or more server computing systems 1210a-1210f logically connected to each other and a central data store 1212, through a network including one or more network devices 1214a and 1214b. Server computing systems 1210a-1210f may be individually referred to herein as server computing system 1210 or collectively referred to herein as server computing systems 1210. Network devices 1214a and 1214b may be individually referred to herein as network device 1214 or collectively referred to herein as network devices 1214. Central data store 1212 may be configured to store data, such as, by way of example, traffic data, sensor data, and other data that may be used by server computing systems 1210. Central data store 1212 may be implemented using any computer-readable storage media suitable for carrying or having data or data structures stored thereon. Network devices 1214 may be a computing system or device, such as a router or other networking device, which facilitates the sending and receiving of data and/or information (e.g., data packets) through and between one or more networks. The network may be a local area network, a wide area network, the Internet, and/or other wired or wireless networks.

In some embodiments, each server computing system 1210 may include an agent, such as agent 108, and may be configured to control the flow of traffic through an intersection, such as intersection 100 of FIG. 1. For example, server computing system 1210 may be deployed at an intersection, and may send the traffic data of the intersection to central data store 1212. The traffic data may include information regarding the control of traffic through the intersection, such as traffic signal state information, control actions, data from the sensors deployed at the intersection, and the like. Central data store 1212 may store or be a repository of the historical traffic data provided by server computing systems 1210. Server computing system 1210 deployed at each intersection may be configured to consult central data store 1212 to perform the traffic data analysis and control decisions (e.g., generate a control action for the traffic signals at the intersection) to control the flow of traffic through the intersection. In some embodiments, server computing system 1210 may store some or all of the traffic data in a local data store, such as information data store 310 of FIG. 3.

Clustering layer 1204 may include the groups or clusters of the historical traffic data at each intersection. The historical traffic data of each intersection may be grouped or clustered into one or more traffic pattern clusters. Each traffic pattern cluster may include the state/action/reward history records associated with the respective traffic pattern cluster. As depicted, clustering layer 1204 may include historical traffic data clustered into multiple traffic pattern clusters at one or more intersections 1216a-1216c. Intersections 1216a-1216c may be individually referred to herein as intersection 1216 or collectively referred to herein as intersections 1216. For example, server computing system 1210 (e.g., server computing system 1210a) at intersection 1216 (e.g., intersection 1216a) may cluster the historical traffic data of intersection 1216 (e.g., intersection 1216a) into one or more traffic pattern clusters. In some embodiments, server computing system 1210 at intersection 1216 may consider historical traffic data of one or more neighboring intersections in generating the traffic pattern clusters for intersection 1216. In some embodiments, historical traffic data of neighboring intersections may be assigned weights in accordance with the relevancy of the historical traffic data. For example, the assigned weights may be based on the closeness or nearness of the neighbor intersection to intersection 1216.

Traffic signal control layer 1206 may include the Q-learning categories that may be applied (e.g., used) to generate the control actions for the traffic signals. As depicted, each Q-learning category may be associated with a corresponding traffic pattern cluster at each intersection 1216. Accordingly, each Q-learning category may be used to determine control actions for the traffic signals at an intersection based on the historical traffic data, including the state/action/reward history records, associated with the traffic pattern cluster that corresponds to the respective Q-learning category. For example, server computing system 1210 (e.g., server computing system 1210b) at intersection 1216 (e.g., intersection 1216b) may select a Q-learning category based on traffic data currently observed at intersection 1216 (e.g., intersection 1216b), and apply the selected Q-learning category to generate a control action for the traffic signals at intersection 1216 (e.g., intersection 1216a).

Modifications, additions, or omissions may be made to environment 1208 without departing from the scope of the present disclosure. For example, while illustrated as including six server computing systems 1210, one central data store 1212, and two network devices 1214, environment 1208 may include any number of server computing systems, central data stores, and/or network devices, such as hundreds or thousands server computing systems, more than one central data stores, and a different number of network devices. As another example, environment 1208 may also include one or more other computing systems, such as coordinator system 202. As another example, although illustrated as including three intersections 1216a-1216c, with each intersection 1216 including four traffic pattern clusters, clustering layer 1204 may include a different number of intersections, and each intersection may include a different number of traffic pattern clusters. As a further example, although each intersection 1216 is illustrated as including the same number of traffic pattern clusters, one or more intersections 1216 may include a different number of traffic pattern clusters.

Figure 13:
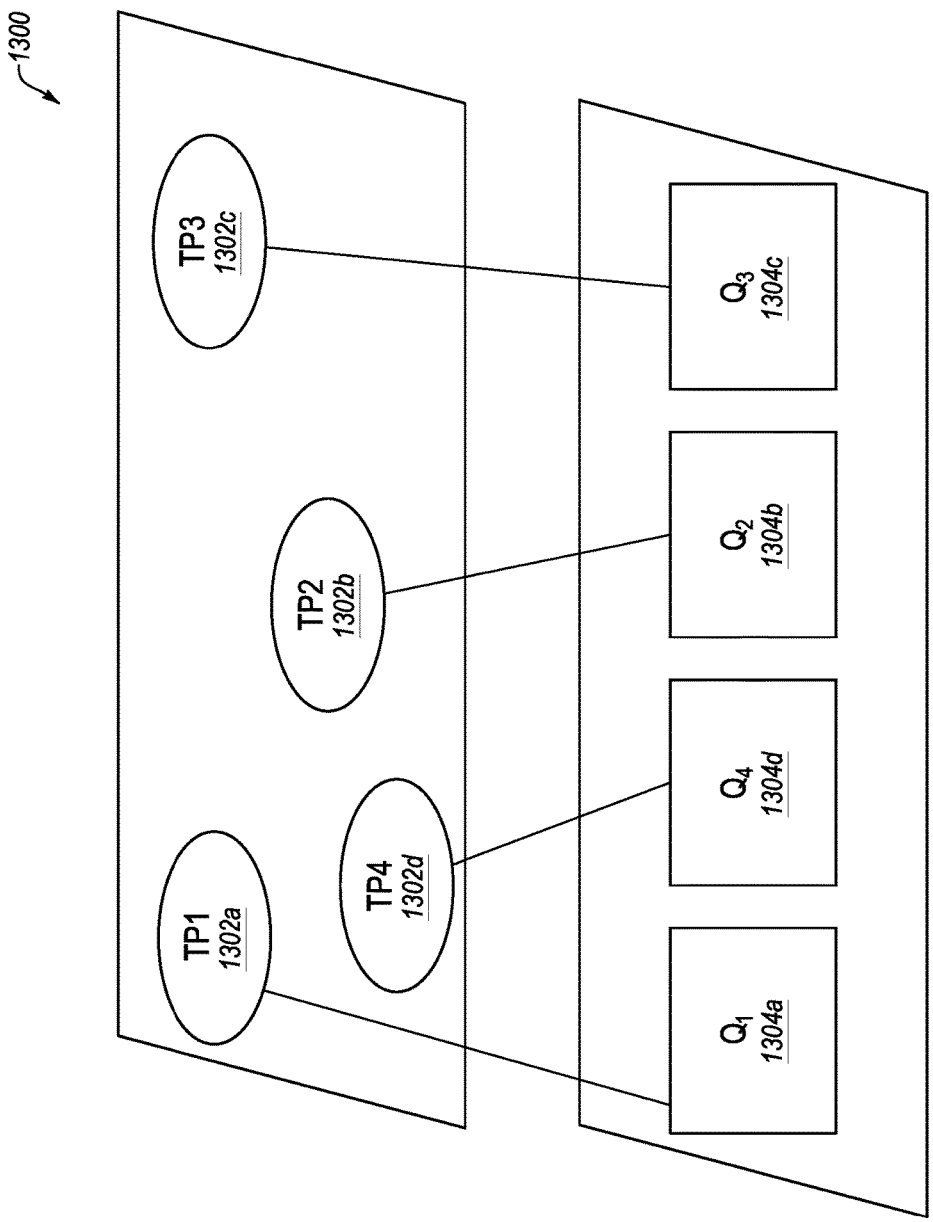
FIG. 13 illustrates an example traffic pattern cluster Q-learning category association at an intersection.

FIG. 13 illustrates an example traffic pattern cluster Q-learning category association at an intersection 1300, arranged in accordance with at least some embodiments described herein. As depicted, intersection 1300 includes four traffic pattern clusters, TP1 1302a, TP2 1302b, TP3 1302c, and TP4 1302d, and four Q-learning categories, $Q_1$ 1304a, $Q_2$ 1304b, $Q_3$ 1304c, and $Q_4$ 1304d. Q-learning category $Q_1$ 1304a corresponds to traffic pattern cluster TP1 1302a, Q-learning category $Q_2$ 1304b corresponds to traffic pattern cluster TP2 1302b, Q-learning category $Q_3$ 1304c corresponds to traffic pattern cluster TP3 1302c, and Q-learning category $Q_4$ 1304d corresponds to traffic pattern cluster TP4 1302d. In some embodiments, an operator with knowledge of traffic data analysis may determine the number of Q-learning categories and the corresponding thresholds for each of the Q-learning categories, for example, based on historical traffic statistics and/or operational policies. Examples of historical traffic statistics may include motorized traffic arrival rate or the number of arriving motorized vehicles for any time window in a day, non-motorized traffic arrival rate or the number of arriving non-motorized users for any time window in a day, queue lengths at intersections for any time window in a day, average frequency of accident occurrence on a particular road, average motorized traffic waiting time for any time window in a day, average non-motorized traffic waiting time for any time window in a day, types of events held at a nearby location, and the like. Examples of operational policies may include maximum green/red light time for motorized traffic, maximum green/red light time for non-motorized traffic, minimum green/red light time for motorized traffic, minimum green/red light time for non-motorized traffic, priority for different directions (e.g. if the intersection interconnects a very wide road with multiple lanes and a narrow road with only one lane), expected average queue length for motorized and non-motorized traffic, and the like. The thresholds may include the properties that define or characterize the different traffic patterns corresponding to each of the Q-learning categories.

The operator may input or provide the number of Q-learning categories and the corresponding thresholds for each of the Q-learning categories to a computing system, such as server computing system 1210, at intersection 1300. The computing system may then cluster (e.g., categorize) the historical traffic data of intersection 1300 into traffic pattern clusters in accordance with the specified (e.g., input) thresholds to generate the specified number of Q-learning categories. In some embodiments, any one or more of the numerous conventional clustering techniques may be utilized to cluster the historical traffic data of the intersection. The operator may then determine the number of Q-learning categories and the corresponding thresholds for each of the Q-learning categories based on an analysis of the clustered historical traffic data.

For example, the operator may determine that four Q-learning categories, one each of normal traffic, heavy traffic, low traffic, and traffic jam, may be appropriate at intersection 1300 based on an analysis of the historical traffic statistics (e.g., historical traffic data) of intersection 1300. The operator may specify the thresholds, such as traffic arriving rates, queue lengths, average waiting time at the intersection, and/or the like, for the four Q-learning categories. For example, the thresholds may include a traffic rate Threshold1, a traffic rate Threshold2, and a traffic rate Threshold3 that delineate (e.g., define) the four Q-learning categories. Observed traffic rate at an intersection below Threshold1 (e.g., observed traffic rate<Threshold1) may correspond to (e.g., indicate) low traffic; observed traffic rate at an intersection between Threshold1 and Threshold2 (e.g., Threshold1<=observed traffic rate<=Threshold2) may correspond to (e.g., indicate) normal traffic; observed traffic rate at an intersection between Threshold2 and Threshold3 (e.g., Threshold2<observed traffic rate<=Threshold3) may correspond to (e.g., indicate) heavy traffic; and observed traffic rate at an intersection above Threshold3 (e.g., observed traffic rate>Threshold3) may correspond to (e.g., indicate) traffic jam. In the example, the traffic pattern cluster TP1 1302a may correspond to normal traffic, traffic pattern cluster TP2 1302b may correspond to heavy traffic, traffic pattern cluster TP3 1302c may correspond to low traffic, and traffic pattern cluster TP4 1302d may correspond to traffic jam. Accordingly, Q-learning category $Q_1$ 1304a corresponding to traffic pattern cluster TP1 1302a may be applied to control actions for the traffic signals at intersection 1300 during normal traffic; Q-learning category $Q_2$ 1304b corresponding to traffic pattern cluster TP2 1302b may be applied to control actions for the traffic signals at intersection 1300 during heavy traffic; Q-learning category $Q_3$ 1304c corresponding to traffic pattern cluster TP3 1302c may be applied to control actions for the traffic signals at intersection 1300 during low traffic; and Q-learning category $Q_4$ 1304d corresponding to traffic pattern cluster TP4 1302d may be applied to control actions for the traffic signals at intersection 1300 during traffic jams. The number of Q-learning categories depicted in intersection 1300, and the thresholds that delineate the Q-learning categories, is for illustration, and one skilled in the art will appreciate that there may be a different number of Q-learning categories.

Figure 14:
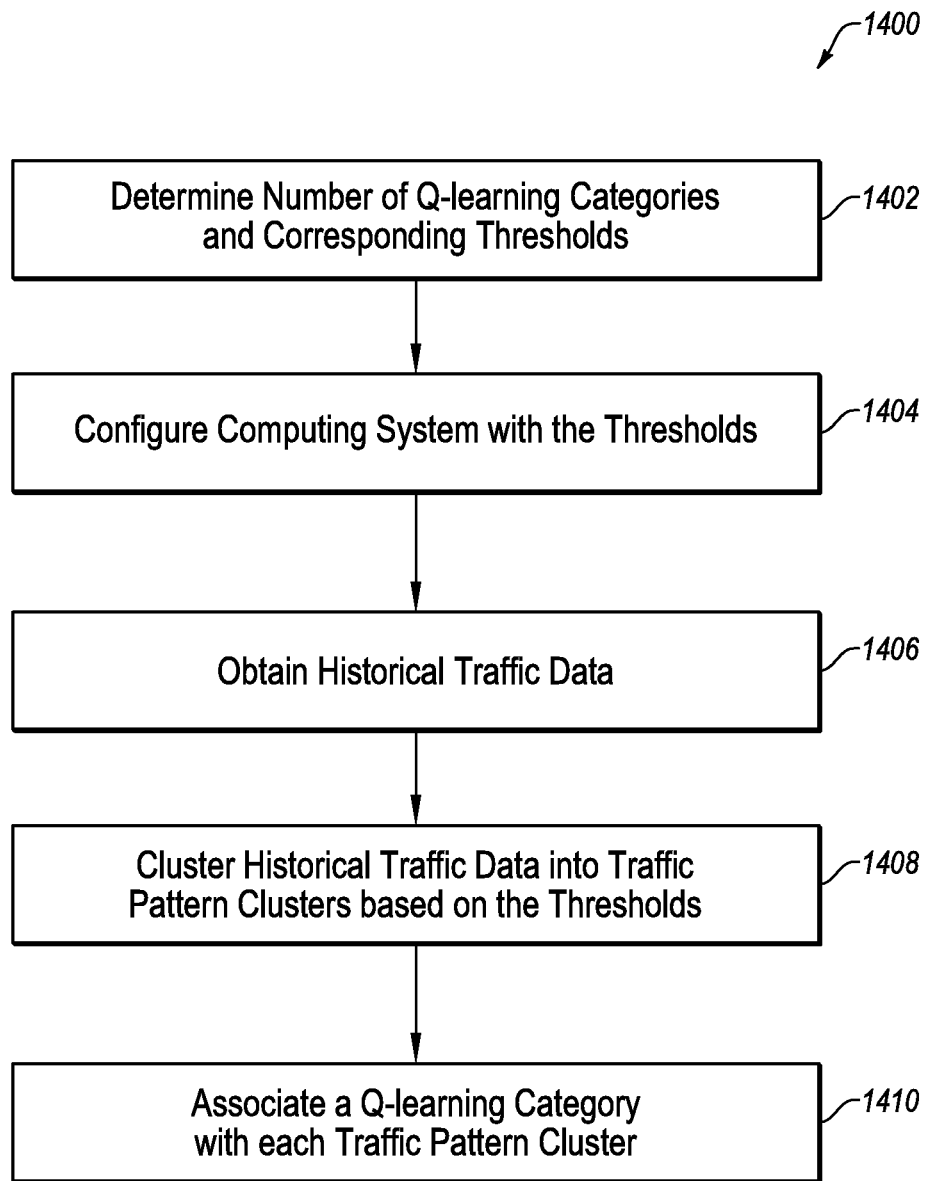
FIG. 14 is a flow diagram that illustrates an example process to cluster historical traffic data that may be performed by an agent such as agent 108 of FIG. 3.

FIG. 14 is a flow diagram 1400 that illustrates an example process to cluster historical traffic data that may be performed by an agent such as agent 108 of FIG. 3, arranged in accordance with at least some embodiments described herein. Example processes and methods may include one or more operations, functions or actions as illustrated by one or more of blocks 1402, 1404, 1406, 1408, and/or 1410, and may in some embodiments be performed by a computing system such as computing system 1000 of FIG. 10. The operations described in blocks 1402-1410 may also be stored as computer-executable instructions in a computer-readable medium such as memory 1004 and/or data storage 1006 of computing system 1000.

As depicted by flow diagram 1400, the example process to cluster historical traffic data may begin with block 1402 ("Determine Number of Q-learning Categories and Corresponding Thresholds"), where an operator may decide the number of Q-learning categories and corresponding thresholds for controlling the traffic signals at an intersection. The thresholds for a specific Q-learning category may characterize the Q-learning category. For example, the operator may analyze the historical traffic statistics (e.g., the historical traffic data) of the intersection, and decide the number of Q-learning categories and the corresponding thresholds based on the analysis of the historical traffic statistics and/or operational policies for controlling the traffic signals at the intersection. In some embodiments, the operator may utilize one or more conventional clustering techniques to cluster the historical traffic data of the intersection, and the operator may decide the number of Q-learning categories and the corresponding thresholds based on an analysis of the clustered historical traffic data and/or operational policies for controlling the traffic signals at the intersection.

Block 1402 may be followed by block 1404 ("Configure Computing System with the Thresholds"), where the operator may configure a computing system, such as an agent (e.g., agent 108 of FIG. 3) configured to control the traffic signals deployed at the intersection, with the thresholds that correspond to the Q-learning categories determined at block 1402.

Block 1404 may be followed by block 1406 ("Obtain Historical Traffic Data"), where the agent configured to control the traffic signals at the intersection may obtain the historical traffic data of the intersection. In some embodiments, the agent may obtain some or all of the historical traffic data of the intersection from a remote data store, such as central data store 1212. Additionally or alternatively, the agent may obtain some or all of the historical traffic data of the intersection from a local data store, such as information data store 310.

Block 1406 may be followed by block 1408 ("Cluster Historical Traffic Data into Traffic Pattern Clusters based on the Thresholds"), where the agent may cluster the historical traffic data of the intersection into traffic pattern clusters based on the specified thresholds. The agent may cluster the historical traffic data using one or more conventional clustering techniques.

Block 1408 may be followed by block 1410 ("Associate a Q-learning Category with a Traffic Pattern Cluster"), where the agent may associate each Q-learning category determined at block 1402 with a corresponding traffic pattern cluster. Accordingly, a Q-learning category associated with a specific traffic pattern cluster is able to determine an optimal action for the traffic signals at the intersection based on its own historical traffic data (e.g., the historical traffic data associated with the specific traffic pattern cluster). In some embodiments, the operator may associate an event to one or more of the traffic pattern clusters, for example, based on traffic data observed during the occurrence of past events. For example, the operator may compare the characteristics (e.g., historical traffic data) of a traffic pattern cluster to recorded traffic data that actually occurred during an event, and associate the traffic pattern cluster to the event based on the similarity between the characteristics of the traffic pattern cluster and the recorded traffic data that actually occurred during the event. In some embodiments, the agent may associate an event to one or more of the traffic pattern clusters based on traffic data observed during the occurrence of past events. The number of thresholds provided in the example above is for illustration, and one skilled in the art will appreciate that there may be a different number of thresholds.

Figure 15:
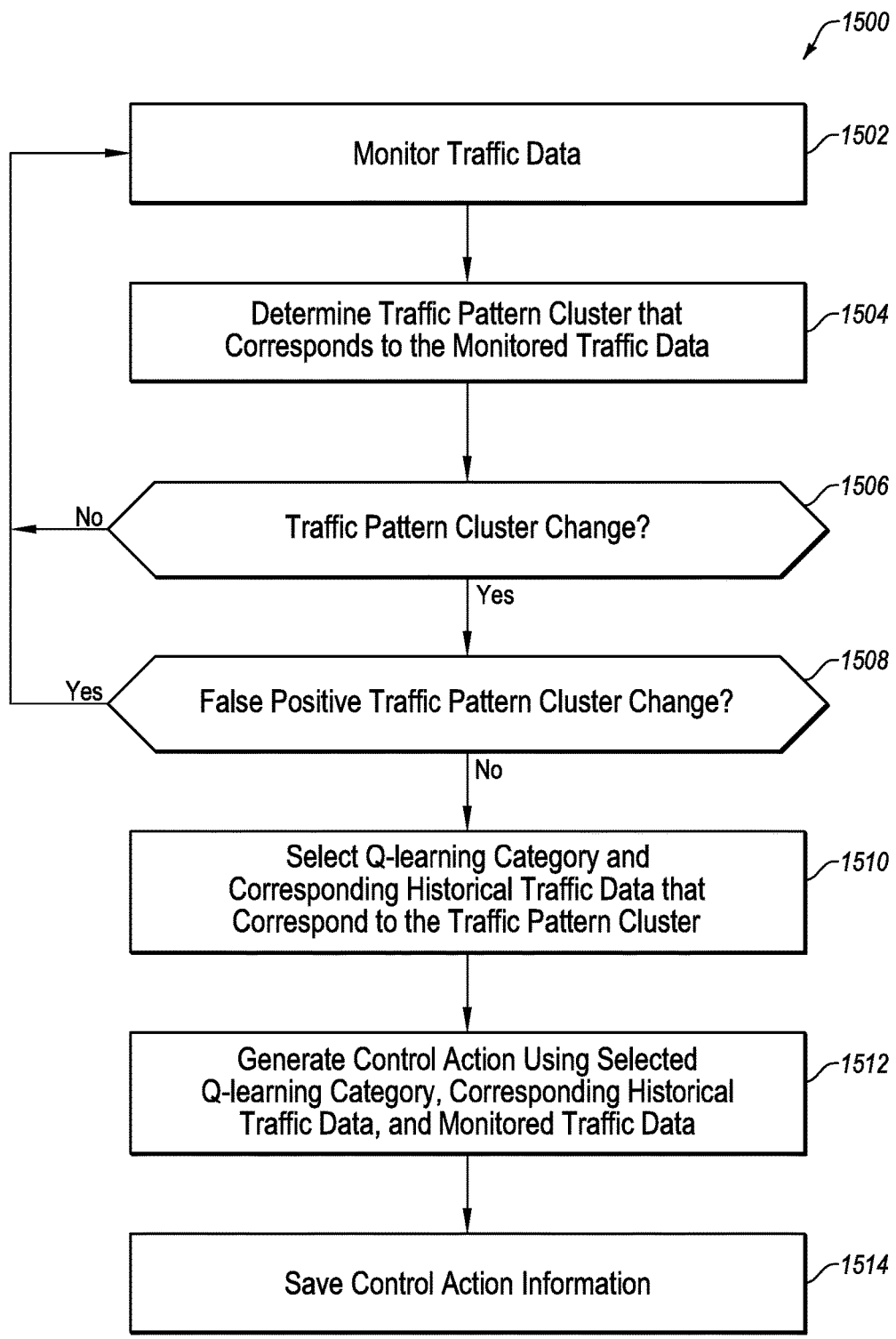
FIG. 15 is a flow diagram that illustrates an example process to generate control actions for traffic signals at an intersection based at least in part on a Q-learning category that may be performed by an agent such as agent 108 of FIG. 3.

FIG. 15 is a flow diagram 1500 that illustrates an example process to generate control actions for traffic signals at an intersection based at least in part on a Q-learning category that may be performed by an agent such as agent 108 of FIG. 3, arranged in accordance with at least some embodiments described herein. Example processes and methods may include one or more operations, functions or actions as illustrated by one or more of blocks 1502, 1504, 1506, 1508, 1510, 1512, and/or 1514, and may in some embodiments be performed by a computing system such as computing system 1000 of FIG. 10. The operations described in blocks 1502-1514 may also be stored as computer-executable instructions in a computer-readable medium such as memory 1004 and/or data storage 1006 of computing system 1000.

As depicted by flow diagram 1500, the example process to generate control actions for traffic signals at an intersection based at least in part on a Q-learning category may begin with block 1502 ("Monitor Traffic Data"), where a computing system, such as an agent (e.g., agent 108 of FIG. 3) configured to control the traffic signals deployed at the intersection, may monitor the traffic data (e.g., the incoming traffic rate) at the intersection. For example, the monitored traffic data may be for a particular (e.g., current) time slot.

Block 1502 may be followed by block 1504 ("Determine Traffic Pattern Cluster that Corresponds to the Monitored Traffic Data"), where the agent may determine a traffic pattern cluster that corresponds to the monitored traffic data. The agent may determine a traffic pattern cluster occurring at the intersection at the particular time slot based on the monitored traffic data. That is, the agent may identify the traffic pattern cluster to which the currently monitored traffic data belongs. For example, there may be multiple clusters of historical traffic data (e.g., multiple traffic pattern clusters) of the intersection, and the agent may identify one of the multiple traffic pattern clusters as being the traffic pattern cluster to which the currently monitored traffic data belongs. The currently monitored traffic data may correspond to the current state of the intersection, for example, $S^t_{i,d}$, and the agent may identify the traffic pattern to which $S^t_{i,d}$ belongs. The agent may then determine the traffic pattern cluster to which the identified traffic pattern belongs.

Block 1504 may be followed by decision block 1506 ("Traffic Pattern Cluster Change?"), where the agent may determine whether there is a change in the traffic pattern cluster. The agent may determine whether the traffic pattern cluster that corresponds to the currently monitored traffic data is different from the traffic pattern cluster that is associated with the Q-learning category that the agent is currently using to generate the control actions for the traffic signals at the intersection. That is, the agent may determine whether the traffic pattern cluster at the particular time slot is different than the traffic pattern cluster that occurred in the preceding time slot. If the agent determines that there is no change in the traffic pattern cluster at the intersection (e.g., the traffic pattern cluster observed at the particular time slot is the same as the traffic pattern cluster observed at the preceding time slot), decision block 1506 may be followed by block 1502, where the agent continues to monitor the traffic data at the intersection. That is, as there is no change in the traffic pattern cluster, the agent may continue to use the current Q-learning category to generate the control actions for the traffic signals at the intersection.

Otherwise, if the agent determines that there is a traffic pattern cluster change, decision block 1506 may be followed by decision block 1508 ("False Positive Traffic Pattern Cluster Change?"), where the agent may determine whether the change in the traffic pattern cluster is a false positive change. The agent may avoid unnecessarily and/or frequently changing traffic pattern clusters when the change in traffic pattern is temporary (e.g., the change to a different traffic pattern is for a small number of time slots).

Figure 16:
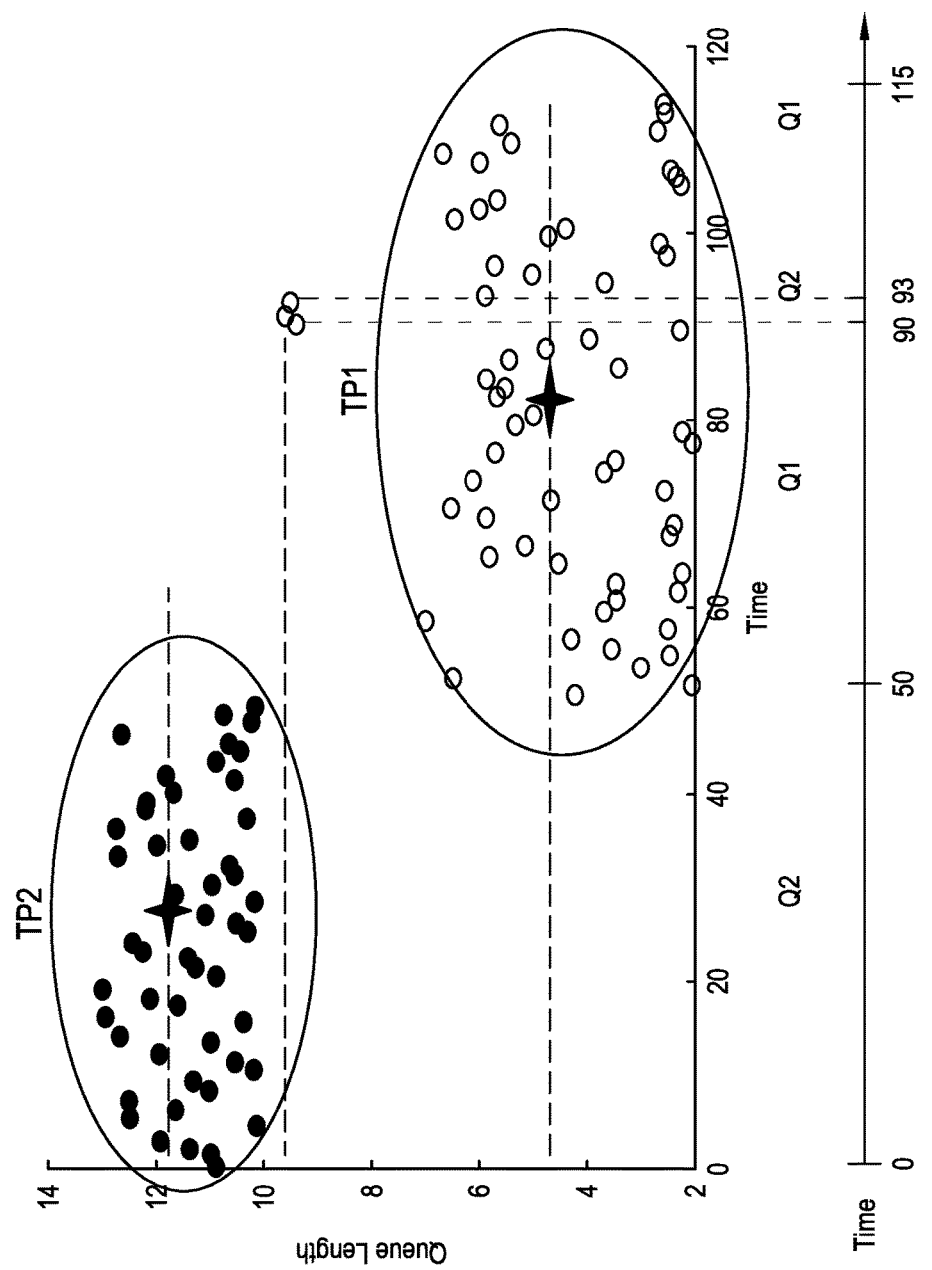
FIG. 16 illustrates an example false positive traffic pattern cluster change.

FIG. 16 illustrates an example false positive traffic pattern cluster change, arranged in accordance with at least some embodiments described herein. In the illustrated example, the historical traffic data at an intersection may be clustered based on queue lengths (e.g., motorized user queue lengths and non-motorized user queue lengths). Based on queue lengths, the historical traffic data of the intersection may be clustered into two traffic pattern clusters, TP1 and TP2, and the two traffic pattern clusters may be associated with respective Q-learning categories, Q1 and Q2. During the period from time 0 to about time 50 (e.g., time slot 0 to time slot 50), traffic data corresponding to traffic pattern cluster TP2 may have been observed at the intersection. Accordingly, Q-learning category Q2 may have been used to control the traffic signals at the intersection. At about time 50 (e.g., time slot 50), there may have been a change in the traffic pattern cluster at the intersection from traffic pattern cluster TP2 to traffic pattern cluster TP1. That is, traffic data corresponding to traffic pattern TP1 was observed at the intersection for a sufficient amount of time (e.g., sufficient number of time slots to not be considered a false positive) to cause a change in traffic pattern cluster from traffic pattern cluster TP2 to traffic pattern cluster TP1. Accordingly, Q-learning category Q1 may have been used to control the traffic signals at the intersection from shortly after about time 50 (e.g., time slot 50). At about time 90 (e.g., time slot 90), traffic data corresponding to traffic pattern cluster TP2 may have been observed at the intersection. The traffic data corresponding to traffic pattern cluster TP2 may have been observed for a very short period of time (e.g., small number of time slots), and, at about time 93 (e.g., time slot 93), traffic data corresponding to traffic pattern cluster TP1 may again have been observed. Changing Q-learning categories from Q1 to Q2 for the short period of time from about time 90 to about time 93 (e.g., small number of time slots), only to change back to Q1 at about time 93 may be unnecessary. Moreover, frequently changing Q-learning categories, which may result in frequent changing (e.g., cycling) in the traffic signals at the intersection, may increase the danger at the intersection. Accordingly, the change from traffic pattern cluster TP1 to traffic pattern cluster TP2 at about time 90, only to last to about time 93 may be considered (e.g., processed as) a false positive traffic pattern cluster change. The number of Q-learning categories provided in the example above is for illustration, and one skilled in the art will appreciate that there may be a different number of Q-learning categories.

Referring again to decision block 1508 of FIG. 15, in some embodiments, the agent may monitor a change in the traffic pattern cluster at the intersection to determine that the new (e.g., different) traffic pattern cluster has been monitored for a specific number of consecutive time slots K, where K>>1, before determining that the change in traffic pattern cluster is not a false positive. In some embodiments, the agent may monitor a change in the traffic pattern cluster at the intersection to determine that the new (e.g., different) traffic pattern cluster has been monitored for at least a certain percentage or number of a specific number of consecutive time slots before determining that the change in traffic pattern cluster is not a false positive. That is, the agent may determine that the new traffic pattern cluster has been monitored for at least a specific number of time slots M in the past (e.g., preceding) specific number of consecutive time slots N, where N>>1 and 1<M<N, before determining that the change in traffic pattern cluster is not a false positive. For example, the thresholds K, M, and/or N may be specified based on an operational policy or policies for controlling the traffic signals at the intersection. Additionally or alternatively, the thresholds K, M, and/or N may vary for the different traffic patterns (e.g., traffic pattern clusters).

In some embodiments, the agent may determine whether the change in the traffic pattern cluster is a false positive change based on a transitional phase. For example, upon observing traffic data that corresponds to a traffic pattern cluster, $e_k$, and before changing to the traffic pattern cluster, $e_k$, the agent may start to count the number of consecutive time slots (e.g., measure of time) in which traffic data corresponding to the traffic pattern cluster, $e_k$, is observed to determine a transitional phase, $L_k$, for determining a change to the traffic pattern cluster, $e_k$. If $L_k$ exceeds a specific threshold, $R_k$, the agent may determine that the change in traffic pattern cluster is not a false positive. That is, the agent may make a change to $e_k$ upon determining that $L_k > R_k$. The threshold $R_k$ may be arbitrarily specified. Additionally or alternatively, the threshold $R_k$ may be specified based on historical traffic data of the intersection. In some embodiments, the threshold $R_k$ may vary based on the frequency of occurrence of $e_k$. That is, the threshold $R_k$ may be based on a probability of the occurrence of $e_k$. For example, if traffic data corresponding to $e_k$ was frequently observed at the intersection, threshold $R_k$ may be lower (e.g., set to a smaller number). Conversely, if traffic data corresponding to $e_k$ was not frequently observed (e.g., rarely observed) at the intersection, threshold $R_k$ may be higher (e.g., set to a higher number). In some embodiments, $R_k$ may vary between a minimum value and a maximum value. The minimum values and/or the maximum value vary based on the frequency of occurrence of $e_k$. In some embodiments, the agent may update (e.g., re-calculate) $R_k$ upon determining a change in the traffic pattern cluster at the intersection. For example, the agent may update $R_k$ to account for the currently observed traffic pattern cluster at the intersection.

Figure 17:
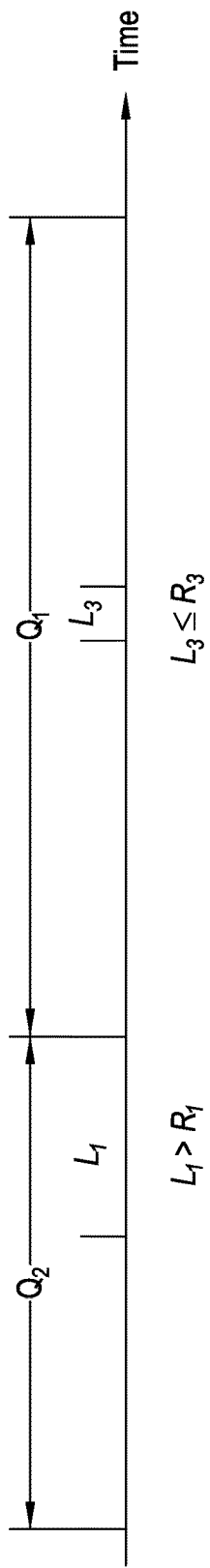
FIG. 17 is a time series diagram illustrating an example traffic pattern cluster change based on a transitional phase.

FIG. 17 is a time series diagram illustrating an example traffic pattern cluster change based on a transitional phase, arranged in accordance with at least some embodiments described herein. As illustrated, while a Q-learning category $Q_2$, which is associated with a traffic data cluster $e_2$, is being used to control the traffic signals at an intersection, an agent at the intersection may observe traffic data corresponding to a traffic pattern cluster $e_1$. Although traffic pattern cluster $e_1$ is observed at the intersection, the agent may continue to use Q-learning category $Q_2$ to control the traffic signals. Rather than changing traffic pattern clusters and corresponding Q-learning categories, the agent may determine a transitional phase $L_1$ for traffic pattern cluster $e_1$. Upon determining that transitional phase $L_1$ exceeds a corresponding threshold $R_1$ (e.g., $L_1 > R_1$), the agent may determine that the change in traffic pattern cluster from $e_2$ to $e_1$ is not a false positive and, accordingly, use Q-learning category $Q_1$ to control the traffic signals. While using Q-learning category $Q_1$ to control the traffic signals at the intersection, the agent may observe traffic data corresponding to a traffic pattern cluster $e_3$. Although traffic pattern cluster $e_3$ is observed at the intersection, the agent may continue to use Q-learning category $Q_1$ to control the traffic signals. Rather than changing traffic pattern clusters and corresponding Q-learning categories, the agent may determine a transitional phase $L_3$ for traffic pattern cluster $e_3$. Having completed determining transitional phase $L_3$ (e.g., the traffic data corresponding to traffic pattern cluster $e_1$ is again observed), the agent may determine that transitional phase $L_3$ does not exceed a corresponding threshold $R_3$ (e.g., $L_3 < R_3$), and, as a result, the agent may determine that the change in traffic pattern cluster from $e_1$ to $e_3$ is a false positive. Having determined that the change from traffic pattern cluster $e_1$ to $e_3$ is a false positive, the agent may continue to use Q-learning category $Q_1$ to control the traffic signals.

Referring again to decision block 1508 of FIG. 15, if the agent determines that the change in the traffic pattern cluster is a false positive change, decision block 1508 may be followed by block 1502, where the agent continues to monitor the traffic data at the intersection. That is, as the change in the traffic pattern cluster is a false positive, the agent may continue to use the current Q-learning category to generate the control actions for the traffic signals at the intersection.

Otherwise, if the agent determines that it is not a false positive traffic pattern cluster change (e.g., the change in traffic pattern cluster is real), decision block 1508 may be followed by block 1510 ("Select Q-learning Category and Corresponding Historical Traffic Data that Correspond to the Traffic Pattern Cluster"), where the agent may select the Q-learning category that corresponds to the current traffic pattern cluster (e.g., the traffic pattern cluster associated with the traffic data currently monitored at the intersection). The agent may retrieve the historical traffic data that corresponds to the current traffic pattern cluster, for example, from a local data store. Additionally or alternatively, the agent may retrieve some or all of the historical traffic data from a remote data store.

Block 1510 may be followed by block 1512 ("Generate Control Action Using Selected Q-learning Category, Corresponding Historical Traffic Data, and Monitored Traffic Data"), where the agent may use the Q-learning category, the retrieved historical traffic data, and the currently monitored (e.g., currently observed) traffic data at the intersection, to generate a control action for the traffic signals at the intersection. In some embodiments, the agent may input the current state of the intersection, $S^t_{i,d}$, as a new state to the Q-learning category, and use the Q-learning category to calculate the immediate reward based on $S^t_{i,d}$, to determine a control action for the traffic signals at the intersection.

Block 1512 may be followed by block 1514 ("Save Control Action Information"), where the agent may save the control action and the information related to the control action (e.g., state/action/reward information) in a data store. Accordingly, the control action and its related information may become part of the historical traffic data of the traffic pattern cluster associated with the Q-learning category. In some embodiments, the agent may maintain a record of the count of a number of times (e.g., frequency) the traffic pattern (e.g., traffic pattern cluster) was observed at the intersection.

Figure 18:
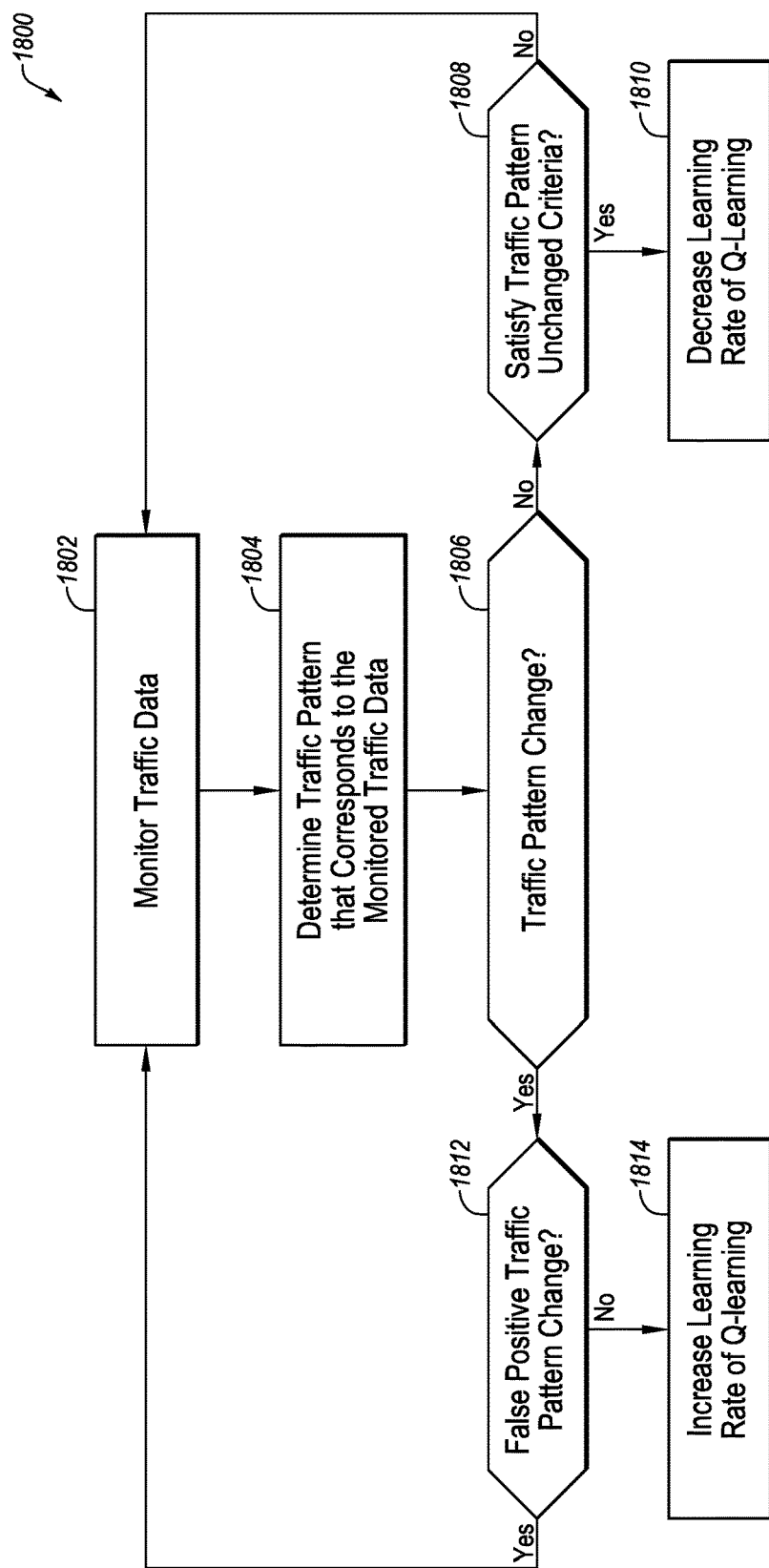
FIG. 18 is a flow diagram that illustrates an example process to adjust a learning rate of Q-learning that may be performed by an agent such as agent 108 of FIG. 3.

FIG. 18 is a flow diagram 1800 that illustrates an example process to adjust a learning rate of Q-learning that may be performed by an agent such as agent 108 of FIG. 3, arranged in accordance with at least some embodiments described herein. Example processes and methods may include one or more operations, functions or actions as illustrated by one or more of blocks 1802, 1804, 1806, 1808, 1810, 1812, and/or 1814, and may in some embodiments be performed by a computing system such as computing system 1000 of FIG. 10. The operations described in blocks 1802-1814 may also be stored as computer-executable instructions in a computer-readable medium such as memory 1004 and/or data storage 1006 of computing system 1000.

As depicted by flow diagram 1800, the example process to adjust a learning rate of Q-learning may begin with block 1802 ("Monitor Traffic Data"), where a computing system, such as an agent (e.g., agent 108 of FIG. 3) configured to control the traffic signals deployed at the intersection, may monitor the traffic data at the intersection. For example, the monitored traffic data may be for a particular (e.g., current) time slot. The monitoring of the traffic data may be for metrics such as traffic rate (e.g., motorized traffic and/or non-motorized traffic arriving at the intersection), queue length (e.g., motorized user queue lengths and/or non-motorized user queue lengths at the intersection), waiting time (e.g., motorized traffic and/or non-motorized traffic average waiting time at the intersection), accident, and/or the like. The metrics may be determined based on an operational policy or policies for controlling the traffic signals at the intersection.

As discussed above, Q-learning works by learning an action-value function that provides an expected utility of taking a given action (e.g., generating a given control action) in a given state (e.g., given state of the traffic signals) and following the optimal policy thereafter. For example, Q-learning equation [2] above may assume a constant or non-varying learning rate α in the entire learning procedure. In some embodiments, learning rate α in the Q-learning equation [2] may depend on the status change of traffic pattern change. The learning rate of Q-learning determines to what extent the newly observed traffic data overrides the older traffic data in learning the action-value function. A learning rate of 0 causes Q-learning to not learn anything (e.g., newly observed traffic data is not considered), while a learning rate of 1 causes Q-learning to consider only the newly observed traffic data.

Block 1802 may be followed by block 1804 ("Determine Traffic Pattern that Corresponds to the Monitored Traffic Data"), where the agent may determine a traffic pattern that corresponds to the monitored traffic data. The agent may determine a traffic pattern occurring at the intersection at the particular time slot based on the monitored traffic data. For example, the traffic pattern may be based on the traffic rate at the intersection. Additionally or alternatively, the traffic pattern may be based on the queue lengths at the intersection.

In some embodiments, an operator may specify the thresholds for the various traffic patterns. The thresholds may be specified based on an operational policy or policies for controlling the traffic signals at the intersection. For example, similar to the discussion above with respect to traffic pattern clusters, the thresholds may delineate the traffic rates into corresponding traffic patterns.

Block 1804 may be followed by decision block 1806 ("Traffic Pattern Change?"), where the agent may determine whether there is a change in the traffic pattern at the intersection. The agent may determine whether the traffic pattern at the particular time slot is different than the traffic pattern that occurred in the preceding time slot. If the agent determines that there is no change in the traffic pattern at the intersection, decision block 1806 may be followed by decision block 1808 ("Satisfy Traffic Pattern Unchanged Criteria?"), where the agent may determine whether the traffic pattern at the intersection has been unchanged for a sufficient length of time (e.g., a traffic pattern unchanged criteria). The traffic pattern unchanged criteria may be specified based on an operational policy or policies for controlling the traffic signals at the intersection, and may indicate a length of time (e.g., number of time slots). In some embodiments, the agent may decrease or reduce the learning rate of Q-learning if the unchanged traffic pattern at the intersection satisfies the traffic pattern unchanged criteria (e.g., the traffic pattern at the intersection remains the same or unchanged for the requisite length of time (e.g., requisite number of time slots)). In some embodiments, the agent may gradually decrease or reduce the learning rate of Q-learning if the unchanged traffic pattern at the intersection satisfies the traffic pattern unchanged criteria. The check against the traffic pattern unchanged criteria may be applied to avoid unnecessary and/or frequent adjustments of the learning rate of Q-learning. For example, if the traffic pattern at the intersection is temporarily constant (e.g., remains the same temporarily), there may be minimal to no benefit to adjusting the learning rate of Q-learning.

In some embodiments, the traffic pattern unchanged criteria may be specified as a specific number of consecutive time slots K, where K>>1. That is, the traffic pattern unchanged criteria may be determined or considered to be met if the traffic pattern at the intersection has been unchanged for K consecutive time slots. In some embodiments, the traffic pattern unchanged criteria may be specified as at least a certain percentage or number of a specific number of consecutive time slots. That is, the traffic pattern unchanged criteria may be determined or considered to be met if, in the past (e.g., preceding) N (N>>1) consecutive time slots, at least M time slots have the same traffic pattern (1<M<N). For example, the thresholds K, M, and/or N may be specified based on an operational policy or policies for controlling the traffic signals at the intersection. Additionally or alternatively, the thresholds K, M, and/or N may vary for the different traffic patterns.

If the agent determines that the traffic pattern at the intersection has not been unchanged for the sufficient length of time, decision block 1808 may be followed by block 1802, where the agent may monitor the traffic data at the intersection. For example, the agent may continue to monitor the traffic data at the intersection for the next or subsequent time slot.

Otherwise, if the agent determines that the traffic pattern unchanged criteria is satisfied, decision block 1808 may be followed by block 1810 ("Decrease Learning Rate of Q-learning"), where the agent may decrease the learning rate of Q-learning. The agent may decrease the learning rate of Q-learning so that Q-learning considers more of the historical traffic data of the intersection since the traffic pattern is not changing at the intersection. In some embodiments, the agent may decrease the learning rate to a specific, pre-defined value (e.g., learning rate=0.2, learning rate=0.3, learning rate=0.35, and the like). In some embodiments, the agent may decrease the learning rate by a specific, pre-defined decreasing rate (e.g., learning rate=learning rate−0.1, learning rate=learning rate−0.15, learning rate=learning rate−0.2, and the like). Once the agent appropriately decreases the learning rate, the traffic pattern at the intersection may no longer continue to satisfy the traffic pattern unchanged criteria. That is, the traffic pattern at the intersection may need to satisfy the traffic pattern unchanged criteria from scratch (e.g., from the beginning). For example, assuming that the traffic pattern unchanged criteria is K=10 consecutive time slots, once the traffic pattern remains unchanged for the requisite 10 consecutive time slots, the traffic pattern may need to remain unchanged for another 10 consecutive time slots for the traffic pattern unchanged criteria to be satisfied again (e.g., satisfied for a second time).

In some embodiments, the agent may gradually decrease the learning rate, for example, by varying the specific, predefined value. For example, the agent may decrease the learning rate to a first value upon the traffic pattern at the intersection satisfying the traffic pattern unchanged criteria for a first time. If the traffic pattern unchanged criteria is satisfied a second time, the agent may decrease the learning rate to a second value, which is smaller than the first value. In some embodiments, the agent may decrease the gap or difference between successive values over time. For example, the difference between the first value and the second value may be larger than the difference between the second value and a third value. In some embodiments, the agent may increase the gap or difference between successive values over time. For example, the difference between the first value and the second value may be smaller than the difference between the second value and a third value. The agent may decrease the learning rate until a minimum learning rate value is reached.

In some embodiments, the agent may vary the decreasing rate. For example, the agent may decrease the learning rate by a first decreasing rate upon the traffic pattern at the intersection satisfying the traffic pattern unchanged criteria for a first time. If the traffic pattern unchanged criteria is satisfied a second time, the agent may decrease the learning rate by a second decreasing rate. In some embodiments, the second decreasing rate may be smaller than the first decreasing rate. In this instance, the learning rate reduction decreases over time. In some embodiments, the second decreasing rate may be larger than the first decreasing rate. In this instance, the learning rate reduction increases over time. The agent may decrease the learning rate until a minimum learning rate value is reached.

In some embodiments, once the agent appropriately decreases the learning rate, the traffic pattern at the intersection may continue to satisfy the traffic pattern unchanged criteria. That is, the traffic pattern at the intersection may not need to satisfy the traffic pattern unchanged criteria from scratch (e.g., from the beginning). For example, assume that the traffic pattern unchanged criteria is K=10 consecutive time slots, and that the traffic pattern remains unchanged for the requisite 10 consecutive time slots to satisfy the traffic pattern unchanged criteria. If the traffic pattern for the next consecutive time slot remains unchanged, then the traffic pattern unchanged criteria is again satisfied (e.g., satisfied for a second time).

Having appropriately decreased the learning rate of Q-learning (block 1810), the agent may continue to monitor the traffic data at the intersection for the next or subsequent time slot (block 1802).

Otherwise, if the agent determines that there is a traffic pattern change, decision block 1806 may be followed by decision block 1812 ("False Positive Traffic Pattern Change?"), where the agent may determine whether the change in the traffic pattern is a false positive change. The agent may avoid unnecessary and/or frequent adjustments of the learning rate of Q-learning hen the change in traffic pattern is temporary (e.g., the change to a different traffic pattern is for a small number of time slots). For example, if the traffic pattern change at the intersection is temporary, there may be minimal to no benefit to adjusting the learning rate of Q-learning.

In some embodiments, the agent may monitor a change in the traffic pattern at the intersection to determine that the new (e.g., different) traffic pattern has been monitored for a specific number of consecutive time slots K, where K>>1, before determining that the change in traffic pattern is not a false positive. In some embodiments, the agent may monitor a change in the traffic pattern at the intersection to determine that the new (e.g., different) traffic pattern has been monitored for at least a certain percentage or number of a specific number of consecutive time slots before determining that the change in traffic pattern is not a false positive. That is, the agent may determine that the new traffic pattern has been monitored for at least a specific number of time slots M in the recent (e.g., preceding) specific number of consecutive time slots N, where N>>1 and 1<M<N, before determining that the change in traffic pattern is not a false positive. For example, the thresholds K, M, and/or N may be specified based on an operational policy or policies for controlling the traffic signals at the intersection. Additionally or alternatively, the thresholds K, M, and/or N may vary for the different traffic patterns.

If the agent determines that the change in the traffic pattern is a false positive change, decision block 1812 may be followed by block 1802, where the agent may monitor the traffic data at the intersection. For example, the agent may continue to monitor the traffic data at the intersection for the next or subsequent time slot.

Otherwise, if the agent determines that it is not a false positive traffic pattern change (e.g., the change in traffic pattern is real), decision block 1812 may be followed by block 1814 ("Increase Learning Rate of Q-learning"), where the agent may increase the learning rate of Q-learning. The agent may increase the learning rate of Q-learning so that Q-learning considers more of the recent traffic data of the intersection since the traffic pattern may be frequently changing at the intersection. As the traffic pattern may be frequently changing at the intersection, the more recent traffic data may be more relevant than the more historical traffic data. Accordingly, it may be beneficial for Q-learning to consider more of the recent traffic data and less of the more historical traffic data. In some embodiments, the agent may increase the learning rate to a specific, pre-defined value (e.g., learning rate=0.9, learning rate=0.8, learning rate=0.85, and the like). In some embodiments, the agent may increase the learning rate by a specific, pre-defined increasing rate (e.g., learning rate=learning rate+0.1, learning rate=learning rate+0.15, learning rate=learning rate+0.3, and the like).

In some embodiments, the agent may vary the increase in the learning rate based on a degree or extent of change in the traffic pattern. If the change in the traffic pattern is great or significant, then the agent may increase the learning rate by a large amount. Conversely, if the change in the traffic pattern is small or not significant, then the agent may increase the learning rate by a small amount. In some embodiments, a change in traffic pattern may be determined based on a change in traffic rates corresponding to the traffic patterns.

In some embodiments, an operator may specify the thresholds to designate the degree or extent of change in traffic patterns. The thresholds may be specified based on an operational policy or policies for controlling the traffic signals at the intersection. For example, there may be three thresholds, ThresholdA, ThesholdB, and ThresholdC. ThresholdA may be the highest threshold, ThresholdB may be the middle threshold, and ThesholdC may be the lowest threshold (e.g., ThresholdA>ThresholdB>ThresholdC). As such, a change in traffic pattern that exceeds ThresholdA (e.g., change in traffic pattern>ThresholdA) may be considered a significant change in traffic pattern. A change in traffic pattern that exceeds ThresholdB but not ThresholdA (e.g., ThresholdA>=change in traffic pattern>ThresholdB) may be considered a normal change in traffic pattern, and a change in traffic pattern that exceeds ThresholdC but not ThresholdB (e.g., ThresholdB>=change in traffic pattern>ThresholdA) may be considered a minimal change in traffic pattern. Continuing this example, if the change in traffic pattern is significant, the agent may increase the learning rate to a large increase value (e.g., learning rate=0.9) or to by a large increasing rate (e.g., learning rate=learning rate+0.3). If the change in traffic pattern is normal, the agent may increase the learning rate to a normal increase value (e.g., learning rate=0.8) or to by a normal increasing rate (e.g., learning rate=learning rate+0.2). If the change in traffic pattern is minimal, the agent may increase the learning rate to a minimal increase value (e.g., learning rate=0.7) or to by a minimal increasing rate (e.g., learning rate=learning rate+0.1). The agent may increase the learning rate until a maximum learning rate value is reached. In some embodiments, the agent may adjust the one or more of the thresholds, for example, based on historical traffic data of the intersection. In some embodiments, the agent may adjust one or more of the increase values and/or the increasing rates. The number of thresholds provided in the example above is for illustration, and one skilled in the art will appreciate that there may be a different number of thresholds.

Having appropriately increased the learning rate of Q-learning (block 1814), the agent may continue to monitor the traffic data at the intersection for the next or subsequent time slot (block 1802).

As indicated above, the embodiments described in the present disclosure may include the use of a special purpose or general purpose computer (e.g., processor 1002 of FIG. 10) including various computer hardware or software modules, as discussed in greater detail herein. Further, as indicated above, embodiments described in the present disclosure may be implemented using computer-readable media (e.g., memory 1004 of FIG. 10) for carrying or having computer-executable instructions or data structures stored thereon.

According to some examples, traffic signal control systems configured to control traffic signals at an intersection are described. An example system may include an information data store and an agent coupled to the information data store. The information data store may be configured to store multiple traffic pattern clusters, where each traffic pattern cluster of the multiple traffic pattern clusters may be assigned a Q-learning category. The agent may be configured to determine a first traffic data of an intersection; determine a first traffic pattern cluster of the multiple traffic pattern clusters that corresponds to the first traffic data; generate a first control action for traffic signals at the intersection based at least in part on a first Q-learning category that corresponds to the first traffic pattern cluster; determine a second traffic data of the intersection, the second traffic data being subsequent in time to the first traffic data; determine whether the second traffic data corresponds to the first traffic pattern cluster; responsive to a determination that the second traffic data corresponds to the first traffic pattern cluster, generate a second control action for the traffic signals at the intersection based at least in part on the first Q-learning category; and responsive to a determination that the second traffic data does not correspond to the first traffic pattern cluster, determine a second traffic pattern cluster of the plurality of traffic pattern clusters that corresponds to the second traffic data, and generate a third control action for the traffic signals at the intersection based at least in part on a second Q-learning category that corresponds to the second traffic pattern cluster. In some examples, the agent may also be configured to, responsive to a determination that the second traffic data does not correspond to the first traffic pattern cluster, update the first traffic pattern cluster with the first traffic data.

In some examples, determination of whether the second traffic data corresponds to the first traffic pattern cluster may be based at least in part on a determination of whether the second traffic data occurred in a specific number of consecutive time slots. In other examples, the specific number of consecutive time slots may be based at least in part on a frequency of occurrence of the second traffic pattern cluster that corresponds to the second traffic data. In further examples, determination of whether the second traffic data corresponds to the first traffic pattern cluster may be based at least in part on a determination of whether the second traffic data occurred in a certain percentage of a specific number of consecutive time slots. In still further examples, at least one traffic pattern cluster of the multiple traffic pattern clusters may be associated with an event.

According to some examples, methods to control traffic signals at an intersection are described. An example method may include clustering historical traffic data into multiple traffic pattern clusters; generating multiple Q-learning categories, each Q-learning category of the multiple Q-learning categories corresponding to a traffic pattern cluster of the multiple traffic pattern clusters; determining a first Q-learning category of the multiple Q-learning categories to use in controlling traffic signals at an intersection based at least in part on a first traffic data of the intersection, the first Q-learning category corresponding to a first traffic pattern cluster, the first traffic data corresponding to the first traffic pattern cluster; and generating a first control action for the traffic signals at the intersection based at least in part on the first Q-learning category. In some examples, clustering historical traffic data may be based at least in part on queue lengths. In other examples, clustering historical traffic data may be based at least in part on traffic pattern characteristics.

In further examples, the traffic pattern characteristics may include on one or more thresholds.

According to other examples, the method may also include determining a second traffic data of the intersection; determining whether to change to a second Q-learning category of the multiple Q-learning categories to use in controlling traffic signals at the intersection, the second Q-learning category corresponding to a second traffic pattern cluster, the second traffic data corresponding to the second traffic pattern cluster; and responsive to a determination to change to the second Q-learning category, generating a second control action for the traffic signals at the intersection based at least in part on the second Q-learning category. In some examples determining whether to change to a second Q-learning category may include determining whether the second traffic pattern cluster occurred in a specific number of consecutive time slots. In other examples, the specific number of consecutive time slots may be based at least in part on a frequency of occurrence of the second traffic pattern cluster that corresponds to the second traffic data. In still other examples, determining whether to change to a second Q-learning category may include determining whether the second traffic pattern cluster occurred in a certain percentage of a specific number of consecutive time slots. In further examples, the method may further include, responsive to a determination to change to the second Q-learning category, updating the first traffic pattern cluster with the first traffic data.

According to some examples, non-transitory computer-readable storage media storing thereon instructions for execution by a processor of a computing system are described. An example non-transitory computer-readable storage media storing thereon instructions that, in response to execution by a processor, may cause the processor to generate multiple Q-learning categories, each Q-learning category of the multiple Q-learning categories corresponding to a traffic pattern cluster of multiple traffic pattern clusters; determine a first Q-learning category of the multiple Q-learning categories to use to control traffic signals at an intersection based at least in part on a first traffic data of the intersection, the first Q-learning category corresponding to a first traffic pattern cluster, the first traffic data corresponding to the first traffic pattern cluster; and generate a first control action for the traffic signals at the intersection based at least in part on the first Q-learning category. In some examples, the non-transitory computer-readable storage media may further store thereon instructions that, in response to execution by the processor, causes the processor to, in response to execution by the processor, determine a second traffic data of the intersection; determine whether to change to a second Q-learning category of the multiple Q-learning categories to use to control the traffic signals at the intersection, the second Q-learning category corresponding to a second traffic pattern cluster, the second traffic data corresponding to the second traffic pattern cluster; and responsive to a determination to change to the second Q-learning category, generate a second control action for the traffic signals at the intersection based at least in part on the second Q-learning category. In other examples, the non-transitory computer-readable storage media may further store thereon instructions that, in response to execution by the processor, causes the processor to, responsive to a determination to change to the second Q-learning category, update the first traffic pattern cluster with the first traffic data.

According to some examples, methods to adjust a learning rate of Q-learning being used to control traffic signals at an intersection are described. An example method may include generating control actions for traffic signals at an intersection based on Q-learning, the Q-learning configured to determine the generated control actions based on at least a portion of historical traffic data of the intersection; determining a frequency of change in traffic pattern of the intersection, a change in traffic pattern being a change from a first traffic pattern of the intersection to a second traffic pattern of the intersection; and adjusting a learning rate of the Q-learning based on the determined frequency of change in traffic pattern of the intersection. In some examples, determining the frequency of change in traffic pattern may include determining whether the second traffic pattern occurred in a specific number of consecutive time slots. In other examples, determining the frequency of change in traffic pattern may include determining whether the second traffic pattern occurred in a certain percentage of a specific number of consecutive time slots.

In some examples, adjusting the learning rate of the Q-learning may include increasing the learning rate in accordance with increasing frequency of change in traffic pattern of the intersection. In some examples, increasing the learning rate may include increasing the learning rate based on a degree of change from the first traffic pattern of the intersection to the second traffic pattern of the intersection. In other examples, increasing the learning rate may include increasing the learning rate to a specific predefined value. In still other examples, increasing the learning rate may include increasing the learning rate by a specific predefined increasing rate. In further examples, adjusting the learning rate of the Q-learning may include decreasing the learning rate responsive to a determination that the first traffic pattern of the intersection occurred for a specific number of consecutive time slots. In other examples, decreasing the learning rate may include decreasing the learning rate to a specific predefined value. In further examples, decreasing the learning rate may include decreasing the learning rate by a specific predefined decreasing rate.

According to some examples, traffic signal control systems configured to adjust a learning rate of Q-learning being used to control traffic signals at an intersection are described. An example system may include an information data store and an agent coupled to the information data store. The information data store may be configured to store historical traffic data. The agent may be configured to apply Q-learning to generate control actions for traffic signals at an intersection based on at least a portion of historical traffic data of the intersection; determine whether there is a change in traffic pattern of the intersection, the change in traffic pattern being a change from a first traffic pattern of the intersection to a second traffic pattern of the intersection; and responsive to a determination that there is a change in traffic pattern of the intersection, adjust a learning rate of the Q-learning. In some examples, the determination that there is a change in traffic pattern of the intersection may include a determination that the second traffic pattern occurred in a specific number of consecutive time slots. In other examples, the determination that there is a change in traffic pattern of the intersection may include a determination that the second traffic pattern occurred in a certain percentage of a specific number of consecutive time slots. In some examples, adjust the learning rate of the Q-learning may include an increase of the learning rate based on a degree of change in the traffic pattern of the intersection. In other examples, adjust the learning rate of the Q-learning may include an increase of the learning rate to a specific predefined value. In still other examples, adjust the learning rate of the Q-learning may include an increase of the learning rate by a specific predefined increasing rate.

In some examples, the agent may be further configured to, responsive to a determination that there is not a change in traffic pattern of the intersection, decrease the learning rate of the Q-learning. In other examples, the determination that there is not a change in traffic pattern of the intersection may include a determination that the first traffic pattern occurred in a specific number of consecutive time slots. In further examples, the determination that there is not a change in traffic pattern of the intersection may include a determination that the first traffic pattern occurred in a certain percentage of a specific number of consecutive time slots.

According to some examples, non-transitory computer-readable storage media storing thereon instructions for execution by a processor of a computing system are described. An example non-transitory computer-readable storage media storing thereon instructions that, in response to execution by a processor, may cause the processor to apply Q-learning to generate control actions for traffic signals at an intersection based on at least a portion of historical traffic data of the intersection; determine a frequency of change in traffic pattern of the intersection, a change in traffic pattern being a change from a first traffic pattern of the intersection to a second traffic pattern of the intersection; and adjust a learning rate of the Q-learning based on the determined frequency of change in traffic pattern of the intersection.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method to adjust a learning rate of Q-learning being used to control traffic signals at an intersection, the method comprising:
   generating control actions for traffic signals at an intersection based on Q-learning, the Q-learning configured to determine the generated control actions based on at least a portion of historical traffic data of the intersection;
   determining a frequency of change in traffic pattern of the intersection, a change in traffic pattern being a change from a first traffic pattern of the intersection to a second traffic pattern of the intersection; and
   adjusting a learning rate of the Q-learning based on the determined frequency of change in traffic pattern of the intersection.

2. The method of claim 1, wherein determining the frequency of change in traffic pattern comprises determining whether the second traffic pattern occurred in a specific number of consecutive time slots.

3. The method of claim 1, wherein determining the frequency of change in traffic pattern comprises determining whether the second traffic pattern occurred in a certain percentage of a specific number of consecutive time slots.

4. The method of claim 1, wherein adjusting the learning rate of the Q-learning comprises increasing the learning rate in accordance with increasing frequency of change in traffic pattern of the intersection.

5. The method of claim 4, wherein increasing the learning rate comprises increasing the learning rate based on a degree of change from the first traffic pattern of the intersection to the second traffic pattern of the intersection.

6. The method of claim 4, wherein increasing the learning rate comprises increasing the learning rate to a specific predefined value.

7. The method of claim 4, wherein increasing the learning rate comprises increasing the learning rate by a specific predefined increasing rate.

8. The method of claim 1, wherein adjusting the learning rate of the Q-learning comprises decreasing the learning rate responsive to a determination that the first traffic pattern of the intersection occurred for a specific number of consecutive time slots.

9. The method of claim 8, wherein decreasing the learning rate comprises decreasing the learning rate to a specific predefined value.

10. The method of claim 8, wherein decreasing the learning rate comprises decreasing the learning rate by a specific predefined decreasing rate.

11. A traffic signal control system configured to adjust a learning rate of Q-learning being used to control traffic signals at an intersection, the system comprising:
  an information data store configured to store historical traffic data; and
  an agent coupled to the information data store, the agent configured to:
    apply Q-learning to generate control actions for traffic signals at an intersection based on at least a portion of historical traffic data of the intersection;
    determine whether there is a change in traffic pattern of the intersection, the change in traffic pattern being a change from a first traffic pattern of the intersection to a second traffic pattern of the intersection, wherein determining whether there is a change in the traffic pattern includes one or more of: determining whether the second traffic pattern occurred in a specific number of consecutive time slots; and determining whether the second traffic pattern occurred in a certain percentage of the specific number of consecutive time slots; and
    responsive to a determination that there is a change in traffic pattern of the intersection, adjust a learning rate of the Q-learning.

12. The system of claim 11, wherein adjust the learning rate of the Q-learning comprises an increase of the learning rate based on a degree of change in the traffic pattern of the intersection.

13. The system of claim 11, wherein adjust the learning rate of the Q-learning comprises an increase of the learning rate to a specific predefined value.

14. The system of claim 11, wherein adjust the learning rate of the Q-learning comprises an increase of the learning rate by a specific predefined increasing rate.

15. The system of claim 11, further comprising, responsive to a determination that there is not a change in traffic pattern of the intersection, decrease the learning rate of the Q-learning.

16. The system of claim 15, wherein the determination that there is not a change in traffic pattern of the intersection comprises a determination that the first traffic pattern occurred in a specific number of consecutive time slots.

17. The system of claim 15, wherein the determination that there is not a change in traffic pattern of the intersection comprises a determination that the first traffic pattern occurred in a certain percentage of a specific number of consecutive time slots.

18. A non-transitory computer-readable storage media storing thereon instructions that, in response to execution by a processor, causes the processor to:
  apply Q-learning to generate control actions for traffic signals at an intersection based on at least a portion of historical traffic data of the intersection;
  determine a frequency of change in traffic pattern of the intersection, a change in traffic pattern being a change from a first traffic pattern of the intersection to a second traffic pattern of the intersection; and
  adjust a learning rate of the Q-learning based on the determined frequency of change in traffic pattern of the intersection.

* * * * *